US012796866B2

(12) United States Patent
Tang et al.

(10) Patent No.: US 12,796,866 B2
(45) Date of Patent: Nov. 17, 2026

(54) BAKING MACHINE

(71) Applicant: APECOO LLC, San Jose, CA (US)

(72) Inventors: Tingbin Tang, San Jose, CA (US); Jun Li, Foshan (CN); Feng Li, Hengyang (CN)

(73) Assignee: APECOO LLC, San Jose, CA (US)

( * ) Notice: Subject to any disclaimer, the term of this patent is extended or adjusted under 35 U.S.C. 154(b) by 11 days.

(21) Appl. No.: 19/317,188

(22) Filed: Sep. 3, 2025

(65) Prior Publication Data

US 2025/0380708 A1 Dec. 18, 2025

(51) Int. Cl.

| | |
|---|---|
| ***A47J 44/00*** | (2006.01) |
| ***A21B 3/13*** | (2006.01) |
| ***A21B 5/02*** | (2006.01) |
| ***A47J 37/06*** | (2006.01) |
| ***A47J 47/02*** | (2006.01) |

(Continued)

(52) U.S. Cl.

CPC ............... *A47J 44/00* (2013.01); *A21B 3/132* (2013.01); *A21B 5/02* (2013.01); *A47J 37/0611* (2013.01); *B25J 11/0045* (2013.01); *B65B 69/0008* (2013.01); *B65B 69/005* (2013.01); *H01H 3/40* (2013.01); *A47J 47/02* (2013.01); *B65D 83/771* (2025.01)

(58) Field of Classification Search

CPC ........ A47J 44/00; A47J 37/0611; A47J 47/02; A21B 3/132; A21B 5/02; B25J 11/0045; B65B 69/0008; B65B 69/005; H01H 3/40; B65D 83/771

See application file for complete search history.

(56) References Cited

U.S. PATENT DOCUMENTS 5,190,429 A * 3/1993 Harlegard ........... B65B 69/0008 141/330
9,067,699 B2 * 6/2015 Anatrini .............. B65B 69/0008
(Continued)

FOREIGN PATENT DOCUMENTS

CN 212687524 U * 3/2021
CN 214452525 U * 10/2021

OTHER PUBLICATIONS

Machine English translation of CN-214452525-U (Year: 2021).*
Machine English Translation of CN-212687524-U (Year: 2021).*

*Primary Examiner* — Erwin J Wunderlich

(57) ABSTRACT

The present invention provides a baking machine, comprising: a machine body; an ingredient pack placement area arranged on the machine body, wherein the machine body is provided with an ingredient pack inlet for placing an ingredient pack into the ingredient pack placement area; a pack-breaking mechanism arranged on the machine body and configured to cut open the ingredient pack; an pack extruding mechanism arranged on the machine body and configured to extrude ingredients from the ingredient pack; and a cooking mechanism arranged on the machine body and configured to receive the ingredients extruded from the ingredient pack and to cook them. When using the baking machine of the present invention to make waffles, users simply need to place the ingredient pack into the ingredient pack placement area, and the baking machine will complete the automatic production process of pack-breaking, ingredient extrusion, and cooking, thereby significantly reducing cooking time.

17 Claims, 25 Drawing Sheets

(51) Int. Cl.

| | |
|---|---|
| ***B25J 11/00*** | (2006.01) |
| ***B65B 69/00*** | (2006.01) |
| ***B65D 83/00*** | (2006.01) |
| ***H01H 3/40*** | (2006.01) |

(56) References Cited

U.S. PATENT DOCUMENTS

| | | | | |
|---|---|---|---|---|
| 10,080,369 | B2 * | 9/2018 | Lothe | A47J 37/0611 |
| 11,610,276 | B1 * | 3/2023 | Cohen | G06Q 10/06316 |
| 12,408,798 | B2 * | 9/2025 | He | B25J 9/0084 |
| 2001/0022311 | A1 * | 9/2001 | Sugay | B65B 69/0008 222/424.5 |
| 2007/0101583 | A1 * | 5/2007 | Tsai | B26B 13/12 30/244 |
| 2017/0099803 | A1 * | 4/2017 | Neighbors | A01K 29/005 |
| 2019/0125126 | A1 * | 5/2019 | Cohen | B65D 75/38 |
| 2021/0053744 | A1 * | 2/2021 | Nehus | B65B 57/04 |
| 2021/0107724 | A1 * | 4/2021 | Cohen | A47J 36/321 |
| 2024/0228097 | A1 * | 7/2024 | Miles | B65B 69/0008 |

* cited by examiner

BAKING MACHINE

TECHNICAL FIELD

The present invention belongs to the technical field of baking machines, and particularly relates to a baking machine.

BACKGROUND

In the existing technology, a baking machine used for making waffles and other types of cakes mainly includes cooking pans for cooking, wherein the cooking pans are equipped with molds. Before cooking, a user needs to prepare ingredients in advance, and then mixes the prepared ingredients in a mixing barrel to make batters. Subsequently, the user pours the prepared batters into cake molds for cooking. In the cooking process of the existing equipment, the user needs to manually prepare the ingredients, mix the batter, and clean the mixing barrel and other tools, which is time-consuming and labor-intensive, resulting in a relatively poor user experience.

SUMMARY

The present invention provides a baking machine, aiming to solve the problem that the baking machine used to make waffles in the existing technology requires the user to manually prepare ingredients, make batters and clean a mixing barrel when making waffles, which is time-consuming, resulting in a relatively poor user experience.

In order to solve the above technical problem, the present invention adopts the following technical solution.

A baking machine, comprises:

a machine body;

an ingredient pack placement area, arranged on the machine body, wherein the machine body is provided with an ingredient pack inlet for placing an ingredient pack into the ingredient pack placement area;

a pack-breaking mechanism, arranged on the machine body and used to cut open the ingredient pack;

a pack extruding mechanism, provided on the machine body and used to extrude ingredients from the ingredient pack; and a cooking mechanism, arranged on the machine body and used to receive the ingredient extruded from the ingredient pack and to cook them.

As a further solution, the baking machine further comprises a pack clamping mechanism arranged on the machine body and used to clamp and position the ingredient pack.

Based on the above technical solution, the pack clamping mechanism is designed to clamp and position the ingredient pack placed into the ingredient pack placement area, so that the position of the ingredient pack is stable, thereby facilitating the pack extruding mechanism to extrude the ingredient pack or the pack-breaking mechanism to cut an opening on the ingredient pack. Besides, after the ingredient is extruded from the ingredient pack, it can also prevent the empty ingredient pack from falling on the cooking mechanism, so as to facilitate the collection of the extruded empty ingredient pack.

As a further solution, the baking machine further comprises:

a pack recycling mechanism, arranged on the machine body, wherein the pack recycling mechanism includes a moving frame, a pack collecting bin and a first driving assembly.

The pack clamping mechanism is arranged on the moving frame; or, both the pack clamping mechanism and the pack extruding mechanism are arranged on the moving frame.

The moving frame includes a second position located on an upper side of the cooking mechanism and a first position on an upper side of the pack collecting bin.

The first driving assembly is used to drive the moving frame to reciprocate between the second position and the first position.

Based on the above technical solution, the pack recycling mechanism includes the moving frame, the pack collecting bin, and the first driving assembly, and the pack clamping mechanism and the pack extruding mechanism are both arranged on the moving frame, so that after the pack extruding mechanism finishes extruding the ingredient pack, the first driving assembly can drive the moving frame to move from the second position to the first position. The pack clamping mechanism then releases the empty ingredient pack, so that the empty ingredient pack can fall into the pack collecting bin under the force of gravity. Afterwards, the first driving assembly drives the moving frame back to the second position, so that users can place a new ingredient pack into the ingredient pack placement area to continue cooking. This configuration ensures better process continuity in the baking machine, enabling continuous production. Moreover, since manual collection of the empty ingredient pack is no longer required, operational safety is significantly improved. Additionally, the above configuration also achieves the physical isolation between the cooking area and the empty ingredient pack collection area, so as to prevent contaminations. Furthermore, the continuous production by using the ingredient packs allows the ingredient packs to be directly placed into the pack collecting bin after the batters are completely extruded, which can eliminate the need for cleaning, thereby saving users time.

As a further solution, the first driving assembly includes a first motor and a first transmission assembly, an output end of the first motor is connected to an input end of the first transmission assembly, and an output end of the first transmission assembly is connected to the moving frame.

The moving frame is provided with a first triggering portion, and the machine body is provided with a first microswitch and a second microswitch located on opposite sides of the first triggering portion.

When the first motor drives the moving frame to move toward the first microswitch through the first transmission assembly and the first triggering portion activates the first microswitch, the first motor stops and the moving frame is located at the first position; when the first motor drives the moving frame to move toward the second microswitch through the first transmission assembly and the first triggering portion activates the second microswitch, the first motor stops and the moving frame is located at the second position.

Based on the above technical solution, precise electromechanical control of the stroke of the moving frame is achieved. The first triggering portion moves with the moving frame, when the first microswitch is activated, the first position is locked; when the second microswitch is activated, the second position is locked. This design eliminates the risk of mechanical overtravel, ensures the reliability of position switching, and prevents the overload damage of the motor.

As a further solution, the ingredient pack inlet is arranged adjacent to the first position, and an ingredient pack door is provided on the machine body for opening and closing the ingredient pack inlet.

As a further solution, the ingredient pack door is rotatably connected to the machine body, and a door closing assembly is provided between the ingredient pack door and the machine body. The door closing assembly includes:

a first connecting rack, wherein one end of the first connecting rack is hinged to the ingredient pack door, a first tension spring is provided between the other end of the first connecting rack and the machine body, and an eighth triggering portion is provided on the first connecting rack;

a first curved guide portion, arranged on the machine body, wherein the eighth triggering portion is slidably connected with the first curved guide portion; and a twelfth microswitch, arranged on the machine body, wherein when the ingredient pack door is closed, the eighth triggering portion activates the twelfth microswitch.

Based on the above technical solution, after the ingredient pack door is closed, the first tension spring provides a continuous closing force. The first curved guide portion constrains its movement trajectory by sliding connection with the eighth triggering portion. The cooperation between the eighth triggering portion and the twelfth microswitch not only ensures the ingredient pack door is closed in place, but also achieves power-on when closed and power-off when opened, which has higher safety.

As a further solution, the pack clamping mechanism includes two clamping portions, the machine body is provided with a first mounting portion, the two clamping portions are both arranged on the first mounting portion and respectively located on opposite sides of the first mounting portion; the two clamping portions have a clamping state where they approach each other and clamp the ingredient pack, and a loosening state where they move away from each other and disengage from the ingredient pack; and the pack clamping mechanism further includes a second driving assembly used to drive the two clamping portions to switch between the clamping state and the loosening state.

As a further solution, the second driving assembly includes:

a second motor;

a second lead screw, arranged on an output end of the second motor;

a second nut seat, threadedly connected to the second lead screw; wherein a lower side of the second nut seat is provided with a first inclined surface, and the second nut seat is further provided with a second triggering portion;

a third microswitch and a fourth microswitch, arranged on the machine body and respectively located on opposite sides of the second nut seat;

a linkage member, slidably arranged on the first mounting portion in a vertical direction, wherein a resetting assembly for linkage member is provided between the linkage member and the first mounting portion; an upper side of the linkage member is provided with a second inclined surface that abuts against the first inclined surface, and a lower side of the linkage member is provided with two third inclined surfaces; each of the clamping portions is provided with a fourth inclined surface, and the two third inclined surfaces abut against the two fourth inclined surfaces respectively; and a first elastic assembly, arranged on the first mounting portion and used to drive the two clamping portions to approach each other.

When the second motor drives the second nut seat to move toward the third microswitch through the second lead screw, the second nut seat drives the linkage member to move downward through the cooperation of the first inclined surface and the second inclined surface, and the linkage member drives the two clamping portions to move away from each other and simultaneously stores energy in the resetting assembly and the first elastic assembly through the cooperation of the two third inclined surfaces and the two fourth inclined surfaces. When the second triggering portion activates the third microswitch, the second motor stops, and the two clamping portions are switched to the loosening state.

When the second motor drives the second nut seat to move toward the fourth microswitch through the second lead screw, under the reset action of the resetting assembly and the first elastic assembly, the linkage member moves upward to reset and the two clamping portions approach each other. When the second triggering portion activates the fourth microswitch, the second motor stops, and the two clamping portions are switched to the clamping state.

Based on the above technical solution, the driving logic of the clamping portion is optimized. The second driving assembly pushes the second nut seat through the second lead screw, the linkage member is driven by the first inclined surface to slide vertically, and its third inclined surface interacts with the fourth inclined surface of the clamping portion to convert the vertical motion of the linkage member into horizontal opening and closing movement of the clamping portion, thereby simplifying the transmission structure while ensuring bidirectional synchronous operation. When the linkage member moves downward, the third inclined surface forces the clamping portion to overcome the tension of the first elastic assembly and open. When the linkage member moves upward, the resetting assembly and the first elastic assembly release stored energy, driving the clamping portion to close and the linkage member to reset. The third microswitch and the fourth microswitch locate the travel endpoints of the second nut seat through the second triggering portion, ensuring precise switching between clamping and releasing states.

As a further solution, the pack extruding mechanism includes two extruding portions, the machine body is further provided with a second mounting portion, and the two extruding portions are both arranged on the second mounting portion and respectively located on opposite sides of the ingredient pack placement area.

The two extruding portions have an extruding state where they approach each other and clamp the ingredient pack, and a disengaging state where they move away from each other and disengage from the ingredient pack; the second mounting portion is provided with a second elastic assembly used to drive the two extruding portions to approach each other.

The lower side of the linkage member is further provided with two fifth inclined surfaces, each of the extruding portions is provided with a sixth inclined surface, and the two fifth inclined surfaces abut against the two sixth inclined surfaces respectively.

When the second motor drives the second nut seat to move toward the third microswitch through the second lead screw, the second nut seat drives the linkage member to move downward through the cooperation of the first inclined surface and the second inclined surface, the linkage member drives the two extruding portions to move away from each other through the cooperation of the two fifth inclined surfaces and the two sixth inclined surfaces and simultaneously stores energy in the resetting assembly and the second elastic assembly. When the second triggering portion activates the third microswitch, the second motor stops, and the two extruding portions are switched to the disengaging state.

When the second motor drives the second nut seat to move toward the fourth microswitch through the second lead screw, under the reset action of the resetting assembly and the second elastic assembly, the linkage member moves upward to reset and the two extruding portions approach each other. When the second triggering portion activates the fourth microswitch, the second motor stops, and the two extruding portions are switched to the extruding state.

Based on the above technical solution, through the above configuration, the functionality of the linkage member is extended to control the extruding portion. The linkage member is newly equipped with a fifth inclined surface to cooperate with the sixth inclined surface of the extruding portion, so that the linkage member can synchronously drive the opening and disengagement of the clamping portion and the extruding portion, further simplify the structure of the whole machine and achieve the integrated control of the processing flow.

As a further solution, the first elastic assembly includes two sets of first springs; each set of the first springs is arranged between its corresponding clamping portion and the first mounting portion.

The second elastic assembly includes two sets of second springs; each set of the second springs is arranged between its corresponding extruding portion and the second mounting portion.

As a further solution, the second driving assembly includes:

a first electromagnet;

a first iron core, slidably arranged on the first electromagnet, wherein the first iron core is provided with a first driving part on a side adjacent to the clamping portion, with a diameter that gradually increases from an end adjacent to the clamping portion toward an end far away from the clamping portion; each of the clamping portions is provided with a first abutting portion, and a clearance gap is provided between the two first abutting portions; and a first elastic assembly arranged between the two clamping portions and used to drive the two clamping portions to approach each other.

When the first electromagnet is energized, the first iron core moves toward the space between the two first abutting portions, and the first driving portion drive the two clamping portions move away from each other and switch to the releasing state by abutting against the two first abutting portions, while the first elastic assembly stores energy.

When the first electromagnet is not energized, the first iron core moves away from the two clamping portions and resets to its original position; under the restoring force of the first elastic assembly, the two clamping portions approach each other and switch to the clamping state, and the two first abutting portions approach each other and reset to their original positions.

Based on the above technical solution, by setting the second driving assembly to include a first electromagnet and a slidably arranged first iron core, the switching of the clamping state is achieved through electromagnetic control. When the first electromagnet is energized, the first iron core moves and pushes the first driving part into contact with the first abutting portion, thereby driving the clamping portions to rotate and achieving the opening of the clamping plate. The entire switching process responds rapidly, which can meet the high efficiency requirements for the movement of the clamping portions in high-speed automated equipment.

As a further solution, the two clamping portions are slidably arranged on the first mounting portion;

or, the two clamping portions are rotatably arranged on the first mounting portion.

As a further solution, the pack extruding mechanism includes two extruding portions, the machine body is further provided with a second mounting portion, and the two extruding portions are both arranged on the second mounting portion and respectively located on opposite sides of the second mounting portion.

The two extruding portions have an extruding state where they approach each other and clamp the ingredient pack, and a disengaging state where they move away from each other and disengage from the ingredient pack.

The pack extruding mechanism further includes a third driving assembly used to drive the two extruding portions to switch between the extruding state and the disengaging state; and a fourth driving assembly used to drive the two extruding portions to move from top to bottom in the extruding state to extrude the ingredient from the ingredient pack.

Based on the above technical solution, the third driving assembly is configured to control the two extruding portions to switch between the extruding state and the disengaging state, while the fourth driving assembly is configured to drive the two extruding portions to move from top to bottom in the extruding state to extrude the ingredients from the ingredient pack. The third driving assembly and the fourth driving assembly are configured separately and operate independently, thereby allowing independent adjustment of the extrusion force or extrusion speed according to the viscosity of the ingredient in the ingredient pack.

As a further solution, the third driving assembly includes:

a second motor;

a second lead screw, arranged on an output end of the second motor;

a second nut seat, threadedly connected to the second lead screw, wherein a lower side of the second nut seat is provided with a first inclined surface, and the second nut seat is further provided with a second triggering portion;

a third microswitch and a fourth microswitch, arranged on the machine body and respectively located on opposite sides of the second nut seat;

a linkage member, slidably arranged on the machine body in a vertical direction, wherein a resetting assembly for linkage member is provided between the linkage member and the machine body; an upper side of the linkage member is provided with a second inclined surface that abuts against the first inclined surface, and a lower side of the linkage member is further provided with two fifth inclined surfaces; each of the extruding portions is provided with a sixth inclined surface, and the two fifth inclined surfaces abut against the two sixth inclined surfaces respectively; and a second elastic assembly, arranged on the second mounting portion and used to drive the two extruding portions to approach each other.

When the second motor drives the second nut seat to move toward the third microswitch through the second lead screw, the second nut seat drives the linkage member to move downward through the cooperation of the first inclined surface and the second inclined surface, and the linkage member drives the two extruding portions to move away from each other and simultaneously stores energy in the resetting assembly for linkage member and the second elastic assembly through the cooperation of the two fifth inclined surfaces and the two sixth inclined surfaces. When the second triggering portion activates the third micro-switch, the second motor stops, and the two extruding portions are switched to the disengaging state;

When the second motor drives the second nut seat to move toward the fourth microswitch through the second lead screw, under the reset action of the resetting assembly for linkage member and the second elastic assembly, the linkage member moves upward to reset and the two extruding portions approach each other. When the second triggering portion activates the fourth microswitch, the second motor stops, and the two extruding portions are switched to the extruding state.

As a further solution, the third driving assembly includes:

two second electromagnets, wherein each of the second electromagnets has a second iron core slidably arranged in the vertical direction, a lower side of each of the second iron cores is provided with an eleventh inclined surface, and an upper side of each of the extruding portions is provided with a sixth inclined surface; and a second elastic assembly, arranged on the second mounting portion and used to drive the two extruding portions to approach each other.

When the two second electromagnets are not energized, the two second iron cores move toward the two extruding portions respectively, and the two eleventh inclined surfaces slide along the two sixth inclined surfaces respectively to drive the two extruding portions to move away from each other and switch to the disengaged state, while the second elastic assembly stores energy.

When the two second electromagnets are energized, the two second iron cores move away from the extruding portions and reset to their original positions, under the restoring force of the second elastic assembly, the two extruding portions approach each other and switch to the extruding state.

Based on the above technical solution, the switching between the extruding state and disengaging state is achieved through the electromagnetic control. The entire switching process responds rapidly, which can meet the high efficiency requirements for the movement of the extruding portions in high-speed automated equipment.

As a further solution, the third driving assembly further includes two seventh inclined surfaces arranged on opposite sides of the machine body; and a lower side of each of the extruding portions is provided with an eighth inclined surface.

When the fourth driving assembly drives the two extruding portions to move from top to bottom to a lower end of the ingredient pack placement area, the two eighth inclined surfaces slide along the two seventh inclined surfaces respectively to force the two extruding portions to move away from each other to switch to the disengaging state and store energy in the second elastic assembly.

Based on the above technical solution, when the extruding portions descend to their limit position, the extrusion action is completed. The eighth inclined surfaces of the extruding portions slide along the seventh inclined surfaces of the machine body to generate radial component forces, forcing the extruding portions to overcome the tension of the second elastic assembly and automatically open, so that the extruding portions are separated from the ingredient pack, so as to facilitate the collection of the empty ingredient pack.

As a further solution, the fourth driving assembly includes a fourth motor and a fourth transmission assembly, the fourth motor is connected to an input end of the fourth transmission assembly, and an output end of the fourth transmission assembly is connected to the second mounting portion.

The second mounting portion is provided with a fourth triggering portion, the machine body is provided with a fifth microswitch located on an upper side the fourth triggering portion, and a sixth microswitch located on a lower side the fourth triggering portion.

When the fourth motor drives the second mounting portion and the two extruding portions to move from top to bottom through the fourth transmission assembly until the fourth triggering portion activates the sixth microswitch, the fourth motor stops; when the fourth motor drives the second mounting portion and the two extruding portions to move from bottom to top through the fourth transmission assembly until the fourth triggering portion activates the fifth micro-switch, the fourth motor stops.

Based on the above technical solution, the above configuration achieves closed loop control of the stroke of the ingredient pack extrusion. When the fourth triggering portion activates the sixth microswitch, the extrusion stops (the ingredient is completely extruded), while when the fifth microswitch is activated, the rise stops (returning to standby position), and the invalid stroke is eliminated.

As a further solution, the pack-breaking mechanism includes two scissor heads arranged opposite to each other, and each of the scissor heads is provided with a cutting portion; the two cutting portions have a cutting state and a non-cutting state; and the pack-breaking mechanism further includes a fifth driving assembly used to drive the cutting portions on the two scissor heads to switch between the cutting state and the non-cutting state.

Based on the above technical solution, the pack-breaking mechanism is configured with two scissor heads to cut open the ingredient pack.

As a further solution, the fifth driving assembly includes a fifth motor, a fifth lead screw, and a fifth nut seat; the fifth motor is drivingly connected to the fifth lead screw, and the fifth nut seat is threadedly connected to the fifth lead screw.

Each of the scissor heads is provided with a scissor head guide portion at an end away from its cutting portion; the fifth nut seat is provided with two sliding portions, which are slidably connected to the two scissor head guide portions, respectively. The machine body is provided with a scissor head rotating shaft, and each of the scissor heads is rotatably connected to the scissor head rotating shaft at an end away from the cutting portion.

The fifth nut seat is provided with a fifth triggering portion, and the machine body is provided with a seventh microswitch and an eighth microswitch respectively located on opposite sides of the fifth triggering portion.

When the fifth motor drives the fifth nut seat to move toward the seventh microswitch through the fifth lead screw, the fifth nut seat drives the two sliding portions to slide closer to each other along the two scissor head guide portions respectively, thereby bringing the two cutting portions together to switch to the cutting state. When the fifth triggering portion activates the seventh microswitch, the fifth motor stops. When the fifth motor drives the fifth nut seat to move toward the eighth microswitch through the fifth lead screw, the fifth nut seat drives the two sliding portions to slide away from each other along the two scissor head guide portions respectively, thereby separating the two cutting portions to switch to the non-cutting state. When the fifth triggering portion activates the eighth microswitch, the fifth motor stops.

Based on the above technical solution, precise control of the cutting position can be achieved. When the fifth triggering portion activates the seventh microswitch, the scissor heads are closed (the cutting state); when the eighth microswitch is activated, the scissor heads are opened (the disengaging state), preventing incomplete cutting. When the fifth nut seat moves horizontally, the sliding portion moves along the scissor head guide portion to convert linear motion into rotational opening and closing motions of the scissor heads. Compared to traditional linkage mechanisms, this design reduces space occupation, thereby optimizing the spatial layout.

As a further solution, each of the scissor heads is provided with a pre-clamping pressure block for clamping the ingredient pack, the pre-clamping pressure block is slidably arranged on its corresponding scissor head, and a pressure block elastic resetting member is provided between the pre-clamping pressure block and its corresponding scissor head.

During the process where the fifth driving assembly drives the two cutting portions from the non-cutting state to the cutting state, the two pre-clamping pressure blocks first clamp the ingredient pack and then the two cutting portions cut the ingredient pack. During the process where the fifth driving assembly drives the two cutting portions from the cutting state back to the non-cutting state, the two cutting portions move away from each other before the two pre-clamping pressure blocks.

Based on the above technical solution, the pre-clamping pressure blocks first clamp the ingredient pack to prevent displacement, and the scissor heads subsequently perform cutting operation. During reset, the scissor heads are separated first, and then the pre-clamping pressure blocks are released. This not only solves the problem of tearing flexible ingredient pack during cutting process, but also prevents ingredient contamination of the cutting portions. The pre-clamping and cutting operation are interlocked, and the pressing block elastic resetting member enables the pre-clamping pressure blocks to dynamically adjust the clamping forces during the cutting process, thus to adapt to packaging films of varying thicknesses.

As a further solution, the cooking mechanism includes a first baking pan and a second baking pan located on opposite sides, wherein the first baking pan has a closed state, where it cooperates with the second baking pan to form a cooking chamber, and an open state, where it is flipped and opened away from the second baking pan. An upper side of the cooking chamber is provided with an ingredient inlet used to receive the ingredient extruded from the ingredient pack.

A switching mechanism is provided between the first baking pan and the machine body and used to switch the first baking pan between the closed state and the open state.

Based on the above technical solution, the first baking pan can be flipped open, so that the switching mechanism drives the first baking pan to flip open after the cooking is completed, which is convenient to remove the finished products from the cooking chamber or to clean the first and second baking pans.

As a further solution, the switching mechanism includes a sixth motor, a sixth transmission assembly, and a sixth rotating shaft. An output end of the sixth motor is connected to an input end of the sixth transmission assembly, an output end of the sixth transmission assembly is connected to the sixth rotating shaft, and the sixth rotating shaft is connected to the first baking pan.

The sixth rotating shaft is provided with a sixth triggering portion, and the machine body is provided with a ninth micro switch and a tenth microswitch.

When the sixth motor drives the sixth rotating shaft to rotate counterclockwise through the sixth transmission assembly until the sixth triggering portion activates the ninth micro switch, the sixth motor stops and the first baking pan is switched to the open state. When the sixth motor drives the sixth rotating shaft to rotate clockwise through the sixth transmission assembly until the sixth triggering portion activates the tenth microswitch, the sixth motor stops and the first baking pan is switched to the closed state.

Based on the above technical solution, the above configuration can achieve precise control of the turning angle of the first baking pan. When the sixth triggering portion activates the ninth microswitch, the open state is locked; when the tenth microswitch is activated, the closed state is locked.

As a further solution, a baking machine further comprises a cooking mechanism door body arranged on the cooking mechanism, wherein the cooking mechanism door body is rotatably connected to the machine body, and a door-closing mechanism is provided between the cooking mechanism door body and the machine body. The door-closing mechanism includes:

- a second connecting rack, wherein one end of the second connecting rack is hinged to the cooking mechanism door body, a second tension spring is provided between the other end of the second connecting rack and the machine body, and the second connecting rack is provided with a seventh triggering portion;
- a second curved guide portion, arranged on the machine body, wherein the seventh triggering portion is slidably connected to the second curved guide portion; and
- an eleventh microswitch, arranged on the machine body, wherein when the cooking mechanism door body is closed, the seventh triggering portion activates the eleventh microswitch.

Based on the above technical solution, after the cooking mechanism door body is closed, the second tension spring provides continuous closing force, and the second curved guide portion restricts the motion trajectory of the seventh triggering portion through sliding connection. The cooperation between the seventh triggering portion and the eleventh microswitch not only ensures that the cooking mechanism door body is closed in place, but also cuts off power during door opening, effectively preventing accidental door opening during high-temperature operation.

As a further solution, pack clamping frames are respectively arranged on opposite sides at the bottom of the ingredient pack placement area, and the pack clamping frames are slidably arranged on the machine body.

The two pack clamping frames have a supporting state, where they approach each other to hold the ingredient pack, and a releasing state, where they move away from each other to disengage from the ingredient pack.

The machine body is provided with a seventh driving assembly used to drive the two pack clamping frames to switch between the supporting state and the releasing state.

Based on the above technical solution, the pack clamping frames are provided on the bottom of the ingredient pack placement area to support and limit the ingredient pack placed in the ingredient pack placement area in the supporting state, so as to prevent the ingredient pack from falling directly, thereby facilitating the clamping portions and the extruding portions to clamp or extrude the ingredient pack. The seventh driving assembly is configured to switch the two pack clamping frames into the releasing state to disengaging from the ingredient pack, so that the ingredient pack can drop smoothly under the force of gravity when the pack recycling mechanism recycles the ingredient pack.

As a further solution, the seventh driving assembly includes:

two sets of elastic pack clamping frame resetting members, wherein each set of the pack clamping frame resetting member is arranged between its corresponding pack clamping frame and the machine body, and the two sets of the pack clamping frame resetting members are used to provide elastic return forces that bring the two pack clamping frames closer to each other;

two extruding portions, located on upper sides of the two pack clamping frames respectively, wherein a lower side of each of the extruding portions is provided with a ninth inclined surface, and an upper side of each of the pack clamping frames is provided with a tenth inclined surface; and a fourth driving assembly, used to drive the two extruding portions to move from top to bottom in the extruding state to extrude the ingredient from the ingredient pack.

When the fourth driving assembly drives the two extruding portions to move from top to bottom to a lower end of the ingredient pack placement area, the ninth inclined surfaces on the two extruding portions cooperate with the corresponding tenth inclined surfaces on the pack clamping frames to drive the two pack clamping frames to move away from each other and switch to the releasing state.

Based on the above technical solution, through the above configuration, after the fourth driving assembly drives the two extruding portions to extrude the ingredients in the ingredient pack from top to bottom, the two extrusion portions drive the two pack clamping frames away from each other through the cooperation of the inclined surfaces to relieve the binding effect on the ingredient pack, so as to facilitate the subsequent discarding of the empty ingredient pack.

The present invention has the following beneficial effects.

The baking machine provided by the present invention is provided with an ingredient pack placement area and an ingredient pack inlet, so that ingredient pack is placed into the ingredient pack placement area through the ingredient pack inlet. Since the ingredient pack is filled with prefabricated batter, the steps of measuring ingredients, mixing the batter, and cleaning the mixing barrel are omitted. Compared to traditional baking methods, the present invention significantly reduces cooking time.

The pack-breaking mechanism is configured to cut an opening on the ingredient pack, so as to facilitate the pack extruding mechanism to extrude high-viscosity ingredients in the ingredient pack from the broken opening.

The pack extruding mechanism is configured to extrude the high-viscosity ingredients from the ingredient pack, so that the ingredient residue in the ingredient pack can be greatly reduced, and the utilization rate of the ingredient can be improved.

The cooking mechanism is configured to receive the ingredients extruded from the ingredient pack and cook them to obtain the finished product finally.

With the above configurations, when using the baking machine of the present invention to make waffles, users simply need to place the ingredient pack into the ingredient pack placement area, and the baking machine will complete the automatic production process of pack-breaking, ingredient extrusion, and cooking, thereby significantly reducing cooking time. Besides, since the ingredient pack is filled with pre-measured batter, the sizes of the waffles produced are uniform. The baking machine of the invention can also be used to make corn cakes, potato cakes, bread and other foods by replacing the molds in the cooking mechanism.

BRIEF DESCRIPTION OF THE DRAWINGS

In order to more clearly illustrate the technical schemes in the embodiments of the present invention, accompanying drawings that need to be used in the embodiments are briefly described hereafter. It should be understood that the accompanying drawings in following description are merely some embodiments of the present invention and thus should not be construed as limiting the scope of the present invention. For those who skilled in the art, other accompanying drawings may be obtained based on these accompanying drawings without exerting creative efforts.

Figure 1:
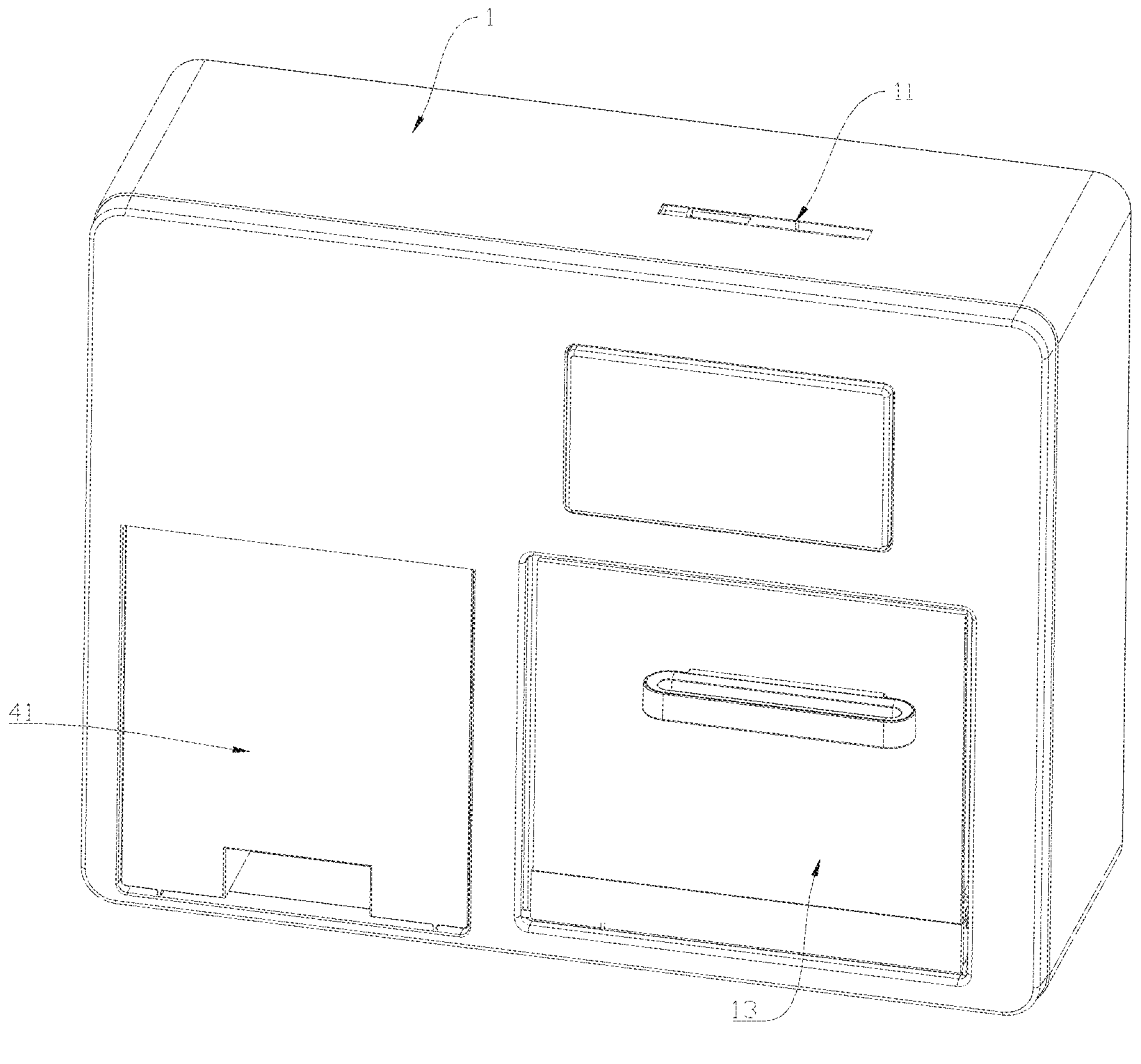
FIG. 1 is a schematic structural view of a baking machine.

The reference numerals in the drawings are as follows: machine body 1; ingredient pack inlet 11; moving frame 12; ingredient pack placement area 121; ingredient pack outlet 122; pack clamping frame 123; base support 123*a*; vertical frame 123*b*; tenth inclined surface 123*c*; first triggering portion 124; cooking mechanism door body 13; door shaft 131; pack clamping mechanism 2; first mounting portion 21; clamping portion 22; fourth inclined surface 221; guide pole 222; first abutting portion 223; clamping plate 224; hinging portion 225; second driving assembly 23; second motor 231; second lead screw 232; second nut seat 233; first inclined surface 223*a*; second triggering portion 233*b*; linkage member 234; second inclined surface 234*a*; third inclined surface 234*b*; fifth inclined surface 234*c*; resetting assembly for linkage member 235; first elastic assembly 236; first spring 236*a*; third microswitch 237; fourth microswitch 238; first electromagnet 239; first iron core 240; first driving part 240*a*; pack extruding mechanism 3; second mounting portion 31; left second mounting portion 311; right second mounting portion 312; fourth triggering portion 313; extruding portion 32; sixth inclined surface 321; eighth inclined surface 322; roller 323; ninth inclined surface 324; third driving assembly 33; second elastic assembly 331; second spring 331*a*; seventh inclined surface 332; second electromagnet 333; second iron core 334; eleventh inclined surface 334*a*; fourth driving assembly 34; fourth motor 341; fourth transmission assembly 342; fourth lead screw 342*a*; fourth guide rod 342*b*; fifth microswitch 343; sixth microswitch 344; pack recycling mechanism 4; pack collecting bin 41; first driving assembly 42; first motor 421; first transmission assembly 422; first lead screw 422*a*; first nut seat 422*b*; first guide rod 422*c*; first microswitch 423; second microswitch 424; second position 43; first position 44; cooking mechanism 5; first baking pan 51; second abutting portion 511; second baking pan 52; ingredient inlet 53; cooking chamber 54; switching mechanism 55; sixth motor 551; sixth transmission assembly 552; sixth rotating shaft 553; sixth triggering portion 553*a*; ninth microswitch 554; tenth microswitch 555; door-closing mechanism 6; second tension spring 61; second connecting rack 62; seventh triggering portion 621; second curved guide portion 63; eleventh microswitch 64; pack-breaking mechanism 7; scissor head 71; scissor head rotating shaft 711; cutting portion 712; scissor head guide portion 713; pre-clamping pressure block 714; pressure block elastic resetting member 715; fifth driving assembly 72; fifth motor 721; fifth lead screw 722; fifth nut seat 723; sliding portion 723*a*; fifth triggering portion 723*b*; seventh microswitch 724; eighth microswitch 725; seventh driving assembly 8; pack clamping frame resetting member 81; ingredient pack 9; ingredient pack door 10; door closing assembly 1011; first tension spring 1012; first connecting rack 1013; eighth triggering portion 1014; first curved guide portion 1015; twelfth microswitch 1016.

DETAILED DESCRIPTION OF EMBODIMENTS

The technical schemes in the embodiments of the present invention will be described clearly and comprehensively hereafter in combination with the accompanying drawings. It should be understood that the embodiments described here are only used to explain the present invention and are not used to limit the present invention. All other embodiments obtained by technicians in this field based on these embodiments without creative efforts shall fall within the protection scope of the present invention.

As shown in FIGS. 1-6, this embodiment provides a baking machine, which comprises: a machine body 1;

- an ingredient pack placement area 121, arranged on the machine body 1, wherein the machine body 1 is provided with an ingredient pack inlet 11 for placing an ingredient pack 9 into the ingredient pack placement area 121; the ingredient in the ingredient pack 9 can be a filling ingredient for making waffles or a semi-finished ingredient for making other foods;
- a pack-breaking mechanism 7, arranged on the machine body 1 and configured to cut open the ingredient pack 9; specifically, by cutting an opening on the ingredient pack 9;
- a pack extruding mechanism 3, provided on the machine body 1 and configured to extrude ingredients from the ingredient pack 9; specifically, the pack extruding mechanism 3 gradually extrudes the ingredients in the ingredient pack 9 from a side far away from the opening of the ingredient pack 9; and
- a cooking mechanism 5, arranged on the machine body 1 and configured to receive the ingredient extruded from the ingredient pack 9 and to cook them.

Figure 3:
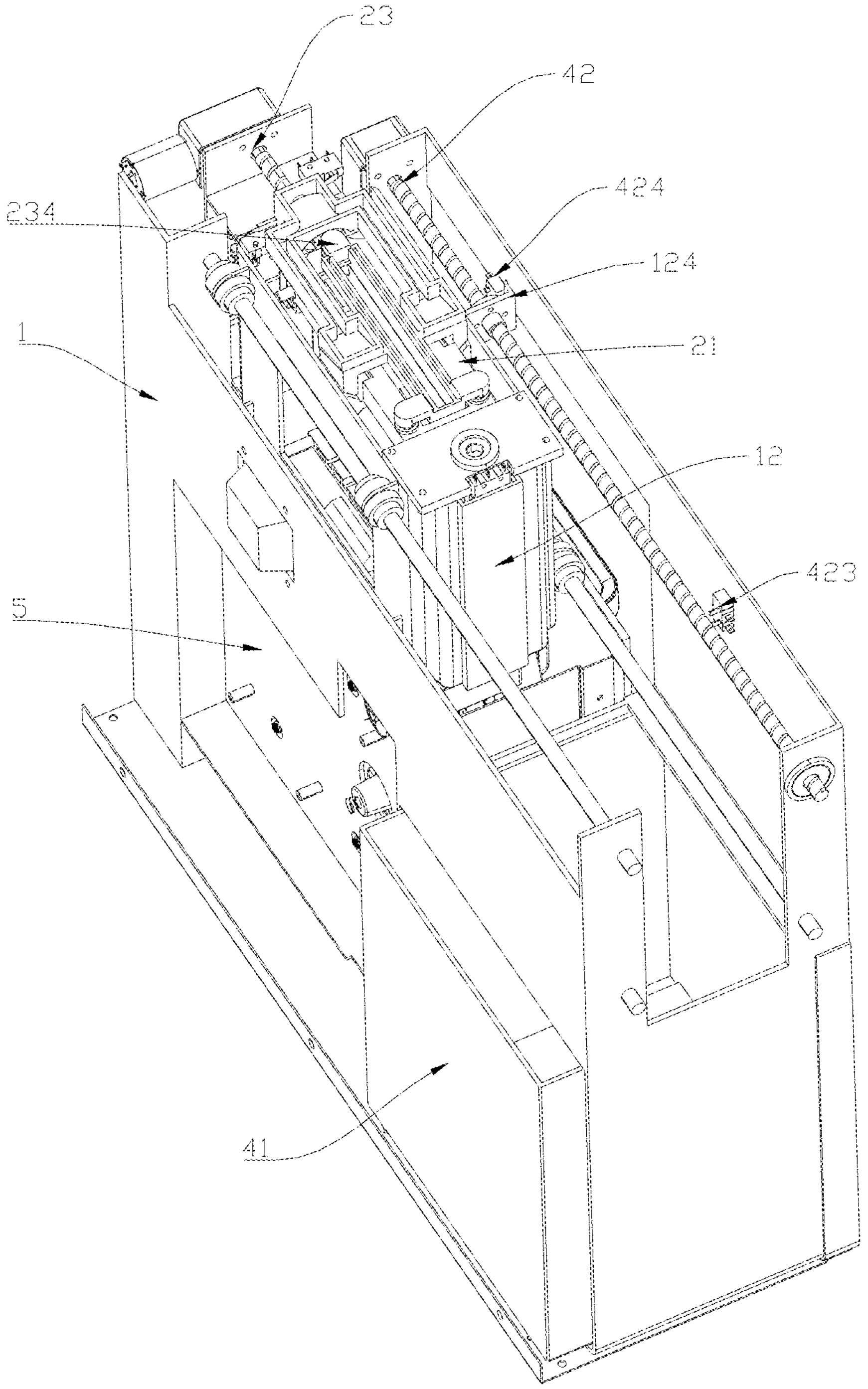
FIG. 3 is a schematic structural view of an internal structure of the baking machine.
Figure 4:
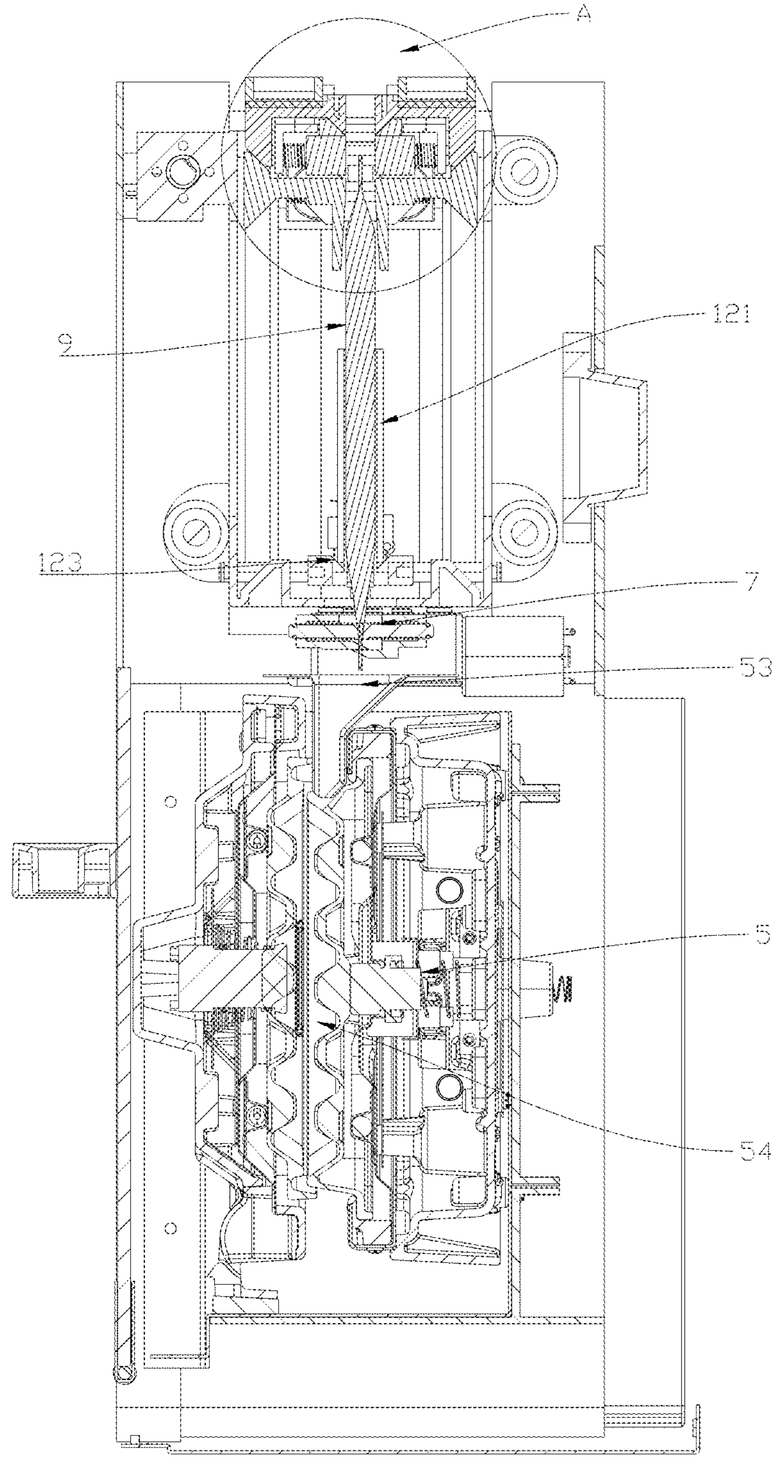
FIG. 4 is a cross-sectional structure view of the baking machine from a first perspective.
Figure 5:
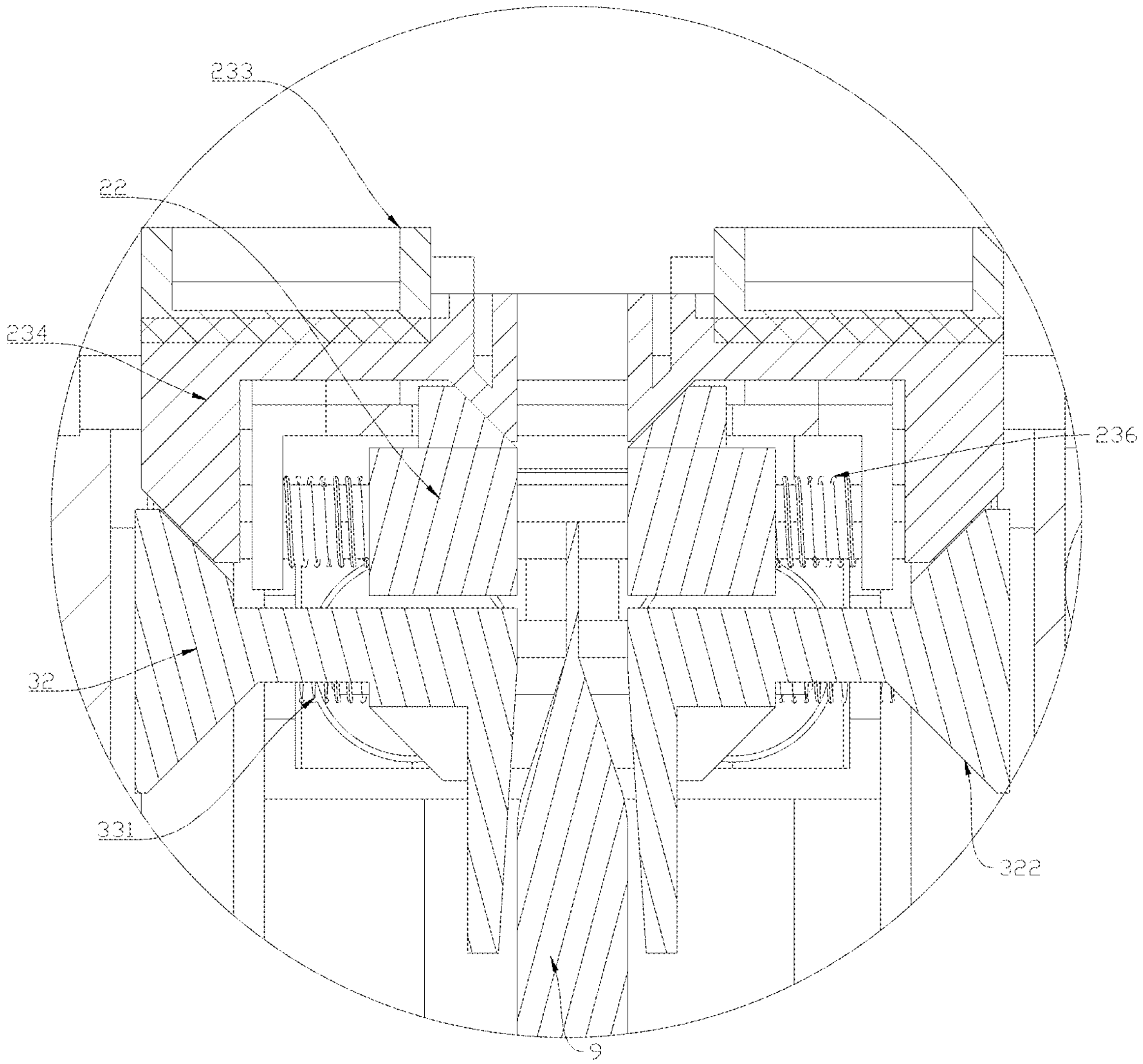
FIG. 5 is an enlarged structural view of Part A in FIG. 4.
Figure 6:
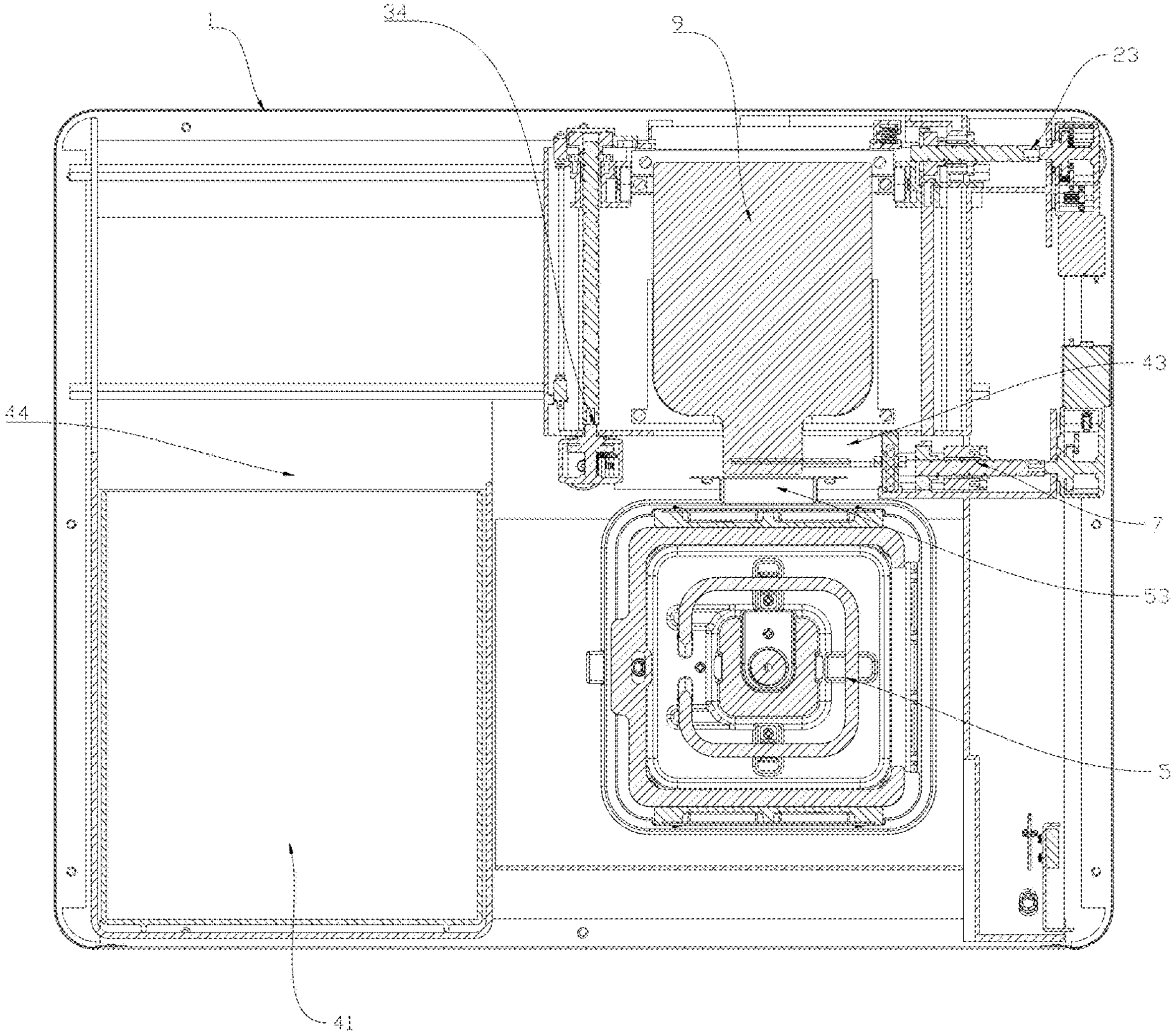
FIG. 6 is a cross-sectional structure view of the baking machine from a second perspective.

In some specific embodiments, as shown in FIGS. 3-5, to enhance the stability of the ingredient pack 9 inside the ingredient pack placement area 121, thereby facilitating its opening and subsequent ingredient extrusion, the baking machine in this embodiment further comprises: a pack clamping mechanism 2, arranged on the machine body 1 and configured to clamp and position the ingredient pack 9. Specifically, after a user places the ingredient pack 9 into the ingredient pack placement area 121, the pack clamping mechanism 2 first clamps and positions the ingredient pack 9, then the pack-breaking mechanism 7 cuts open the ingredient pack 9, and next the pack extruding mechanism 3 extrudes the ingredients from the ingredient pack 9. In this process, the pack clamping mechanism 2 always clamps and positions the ingredient pack 9.

In some specific embodiments, as shown in FIGS. 1-3 and 6-8, in order to facilitate the machine to automatically discard and collect the empty ingredient pack 9 after the extrusion process, the baking machine in this embodiment further comprises:

- a pack recycling mechanism 4, arranged on the machine body 1, wherein the pack recycling mechanism 4 includes a moving frame 12, a pack collecting bin 41 and a first driving assembly 42.

Figure 2:
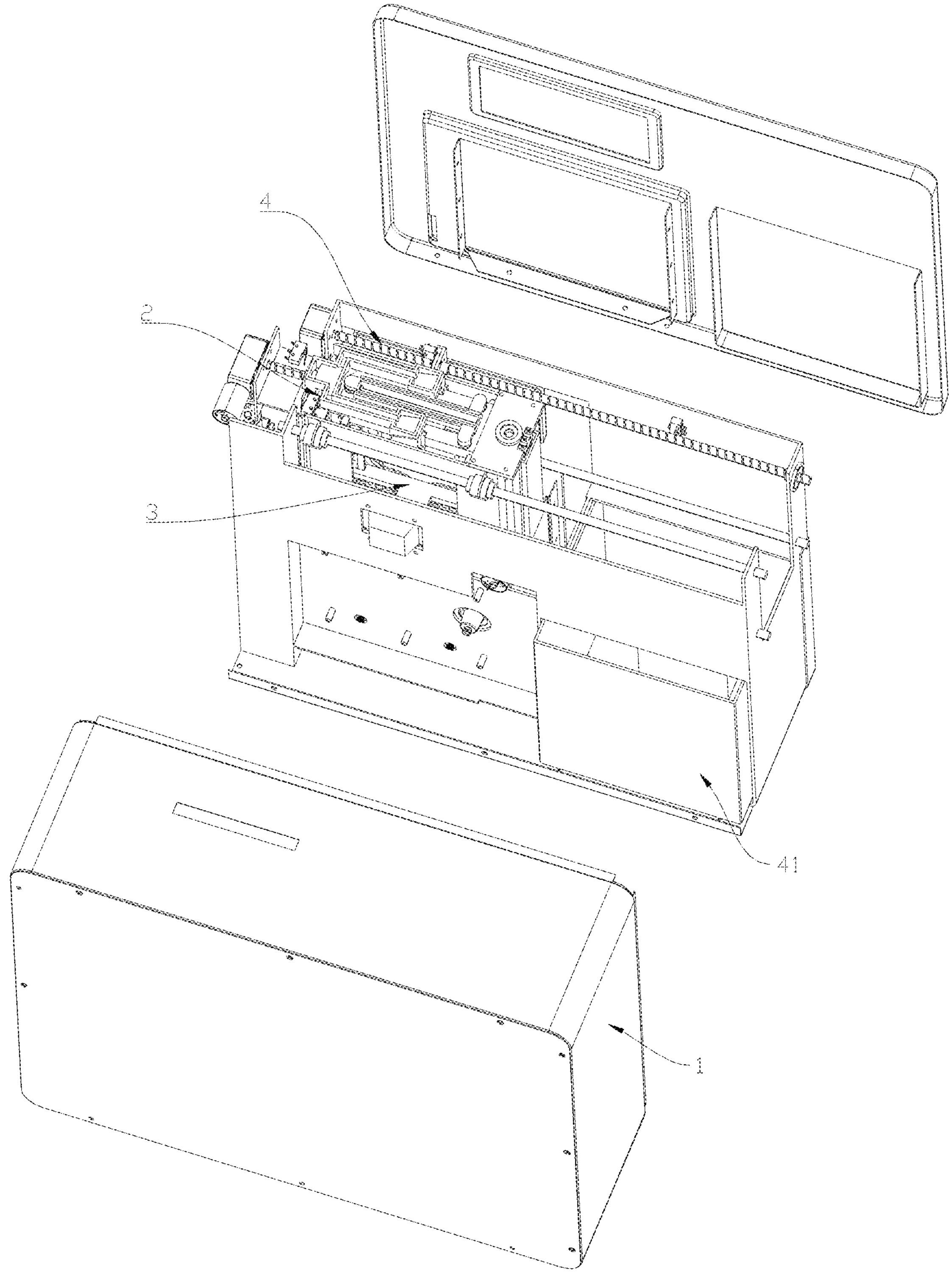
FIG. 2 is an exploded schematic view of the baking machine.
Figure 8:
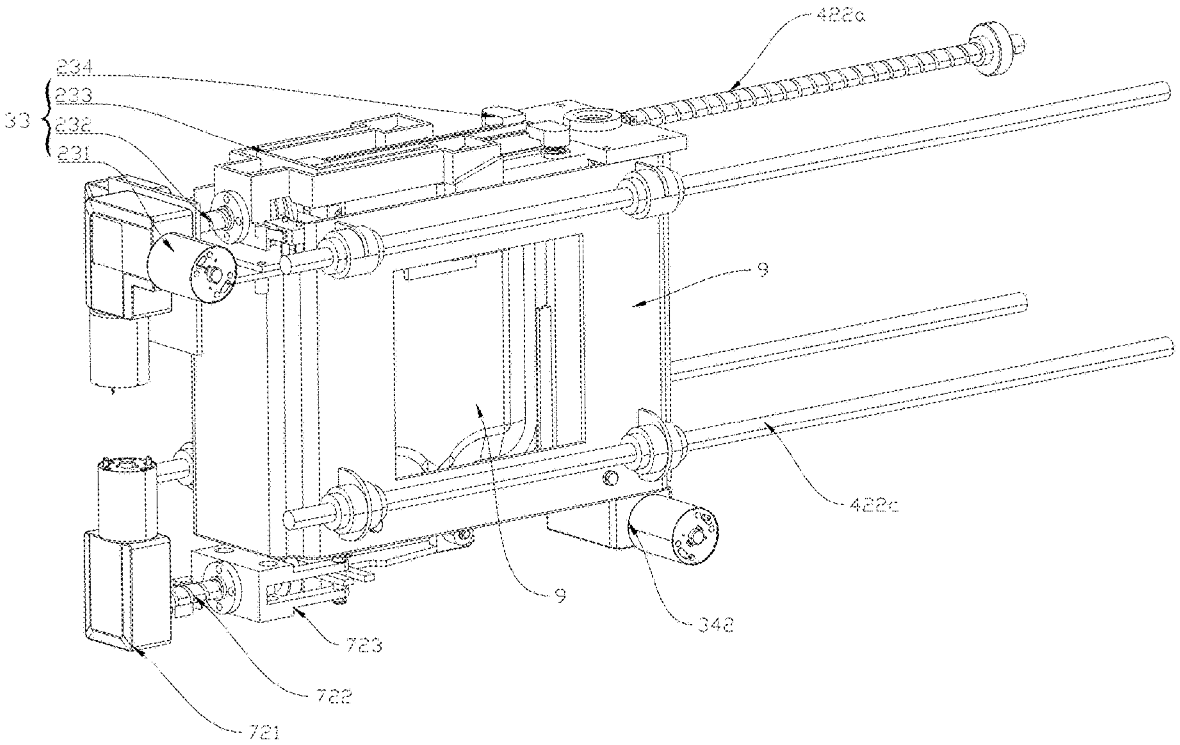
FIG. 8 is a schematic structural view of the pack recycling mechanism and the pack-breaking mechanism from a second perspective.
Figure 9:
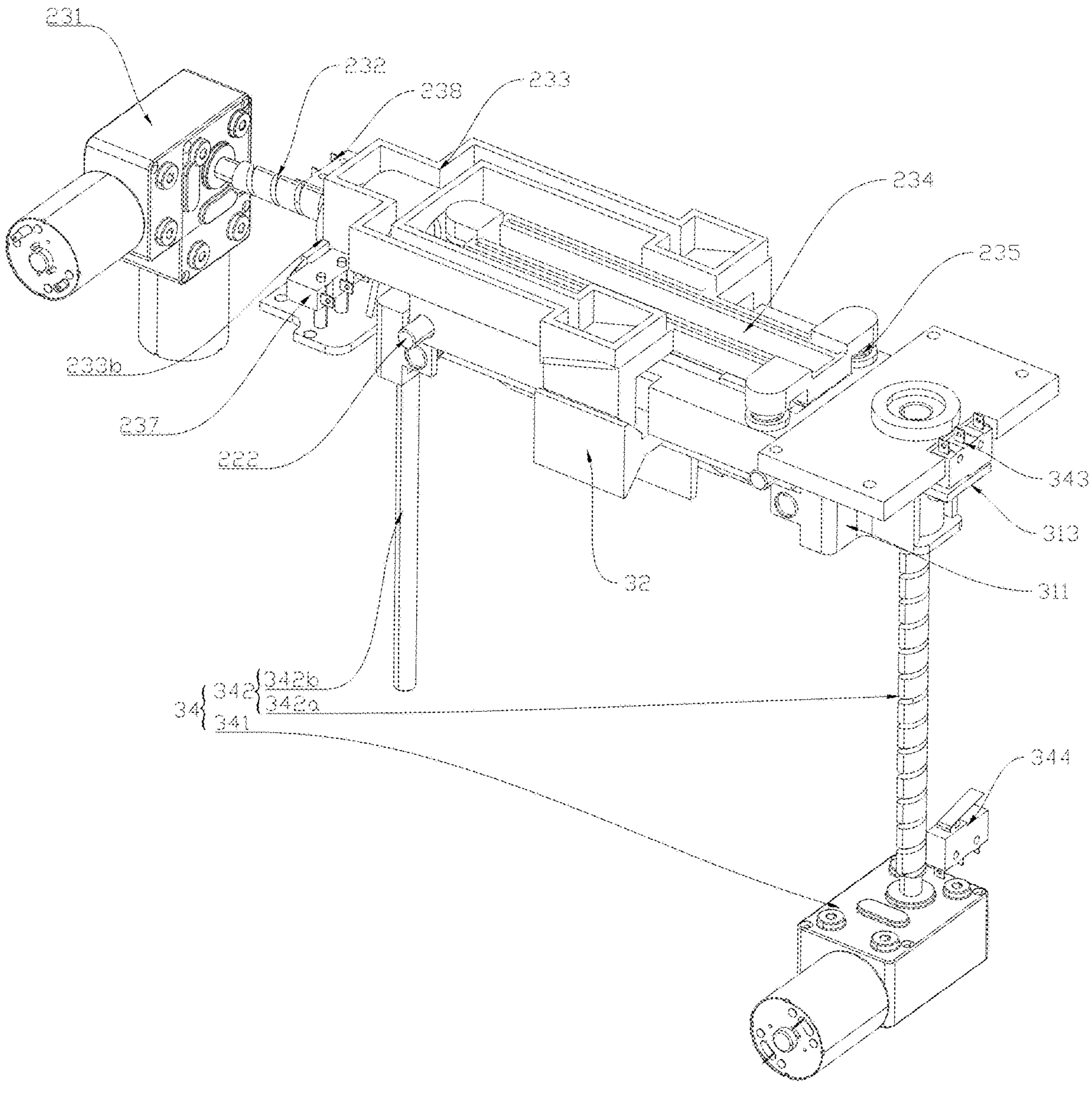
FIG. 9 is a schematic structural view of a pack clamping mechanism and a pack extruding mechanism.
Figure 10:
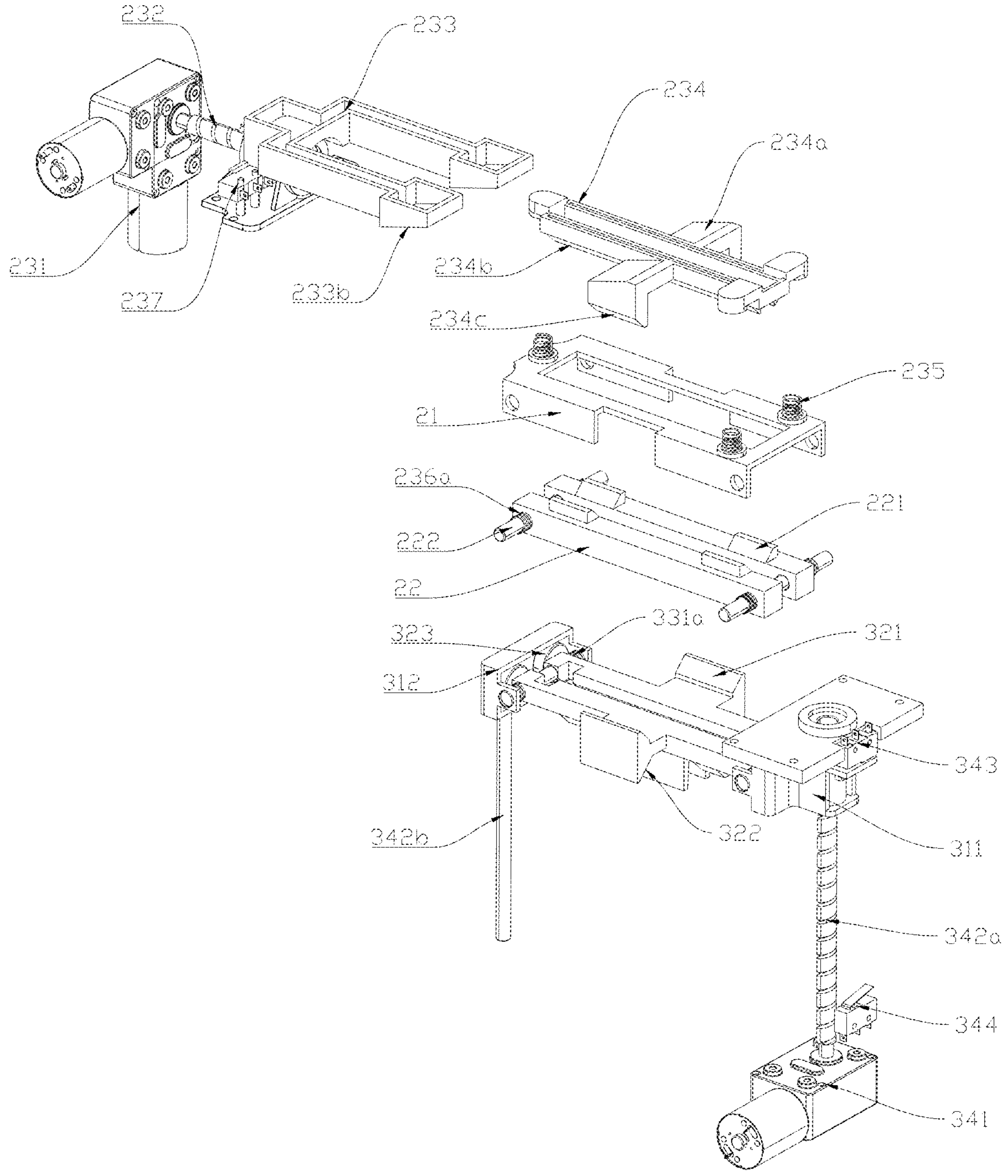
FIG. 10 is an exploded schematic of the pack clamping mechanism and the pack extruding mechanism.
Figure 11:
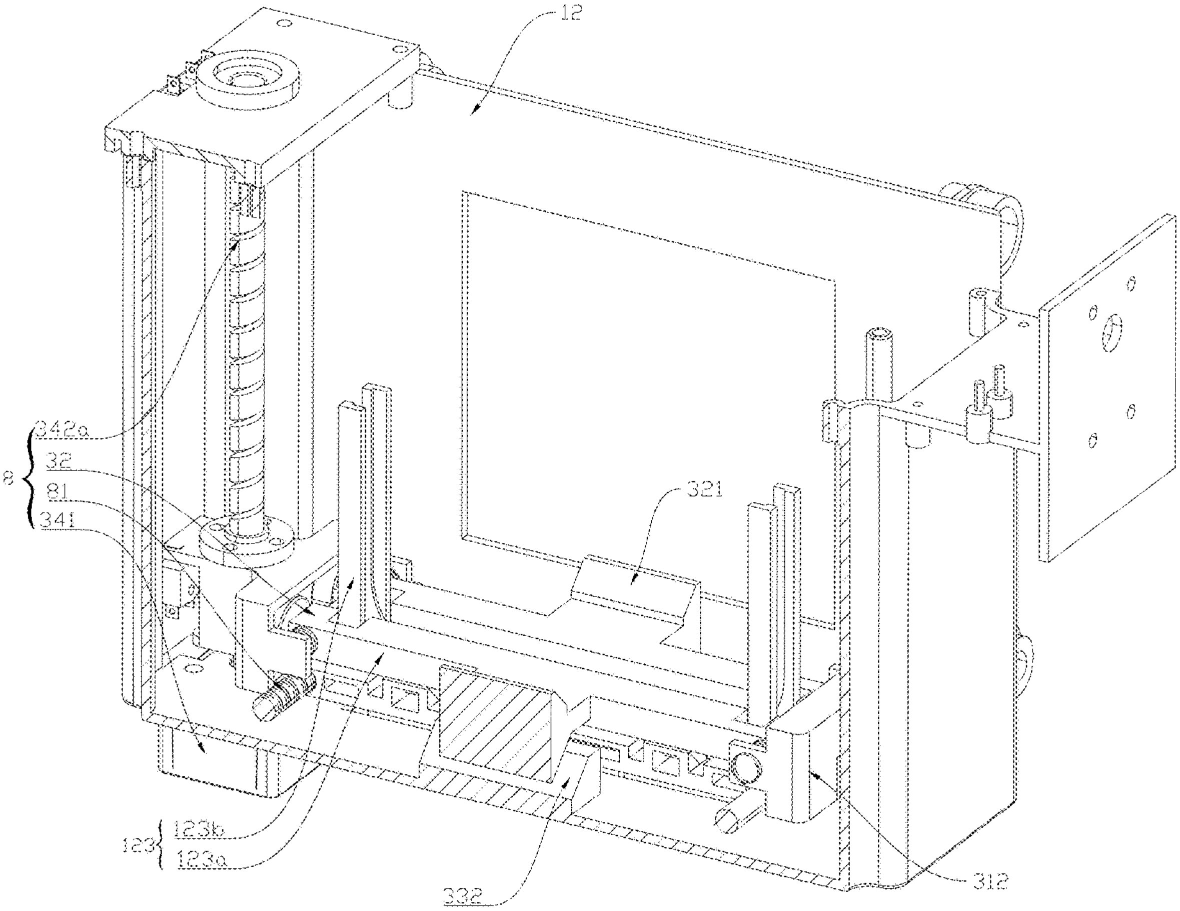
FIG. 11 is a schematic structural view of two extruding portions moved to a lower end of the ingredient pack placement area.
Figure 12:
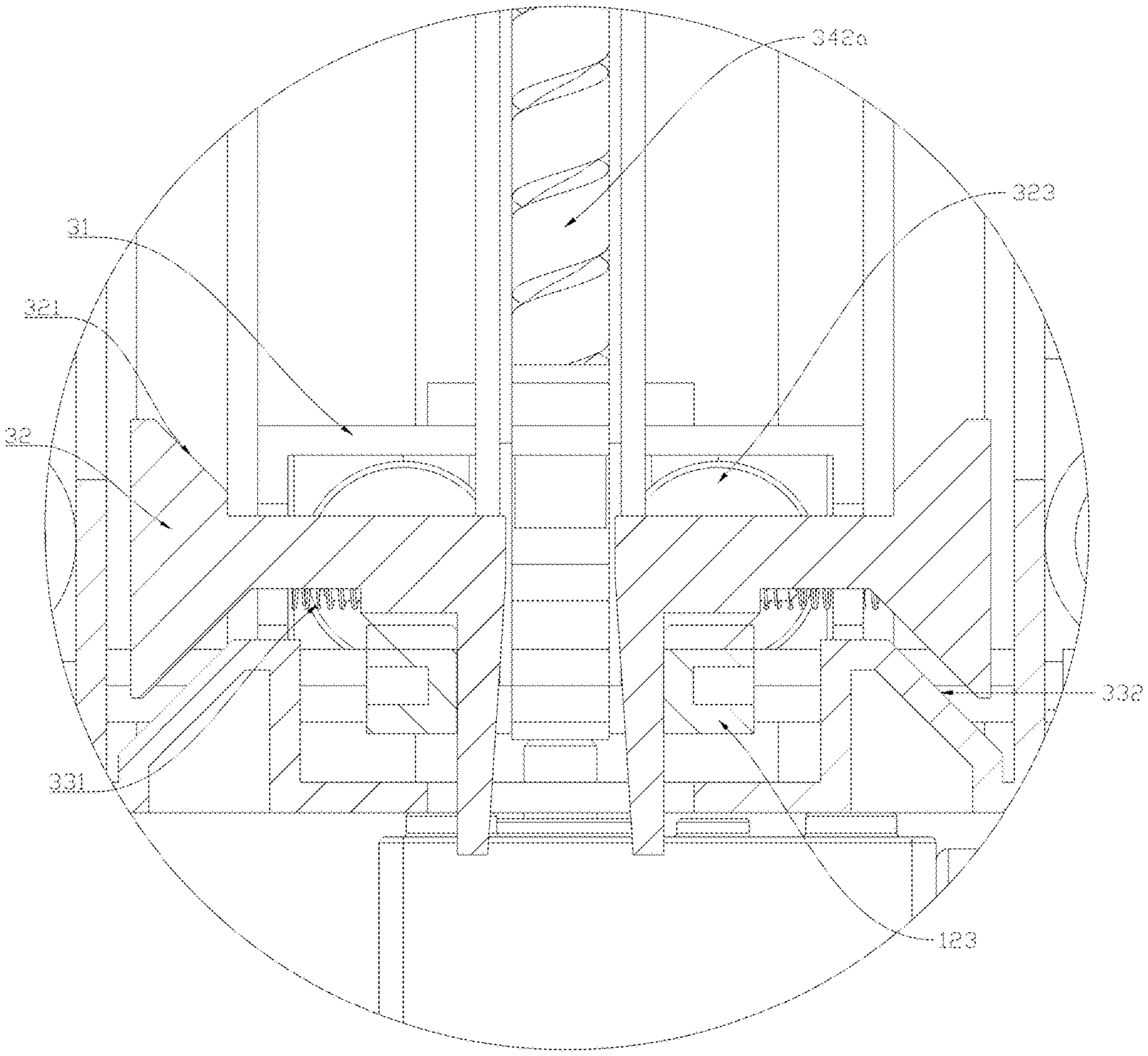
FIG. 12 is a cross-sectional structure view of the two extruding portions moved to the lower end of the ingredient pack placement area.
Figure 13:
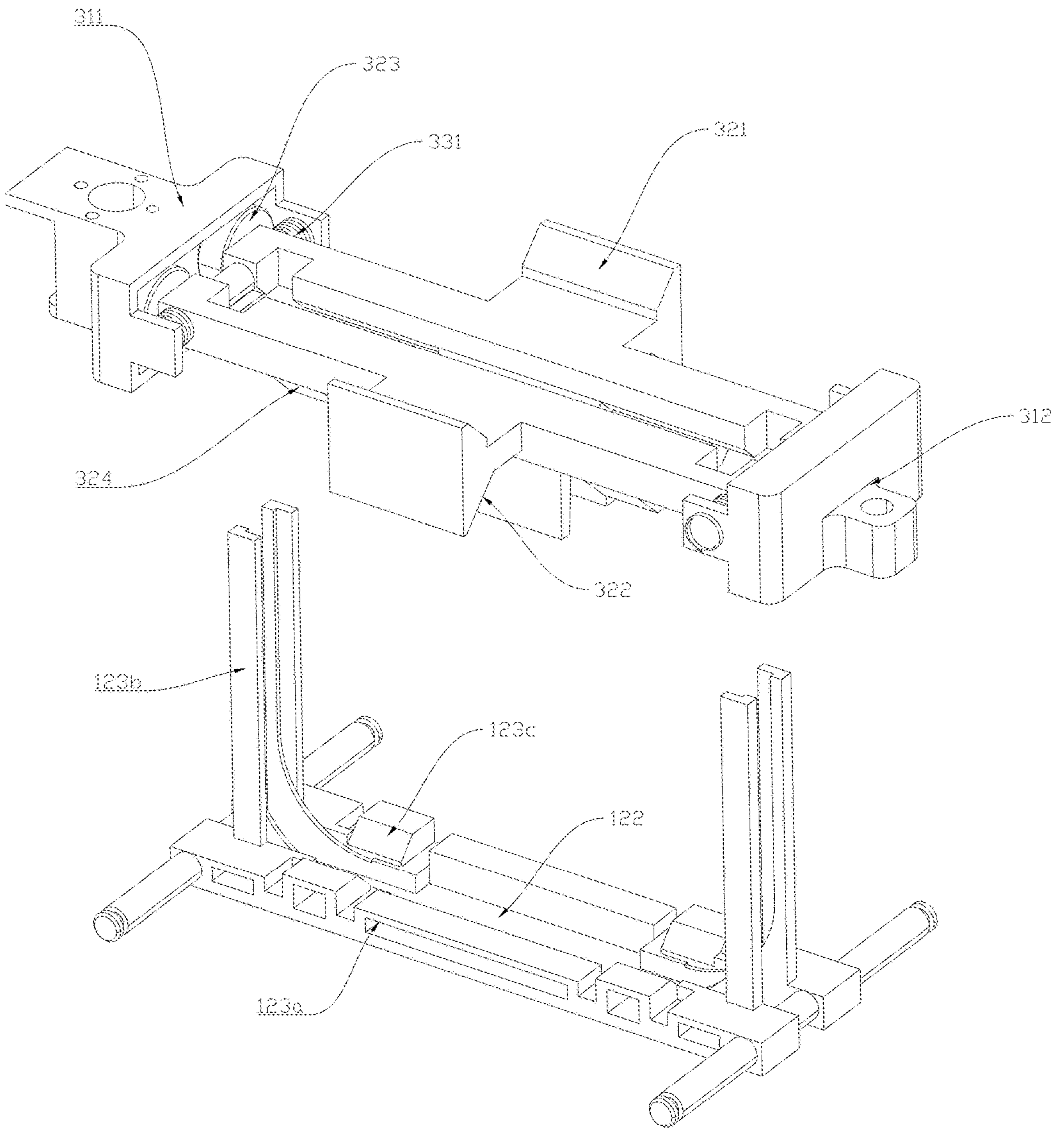
FIG. 13 is an exploded schematic view of the two extruding portions and the two pack clamping frames.
Figure 14:
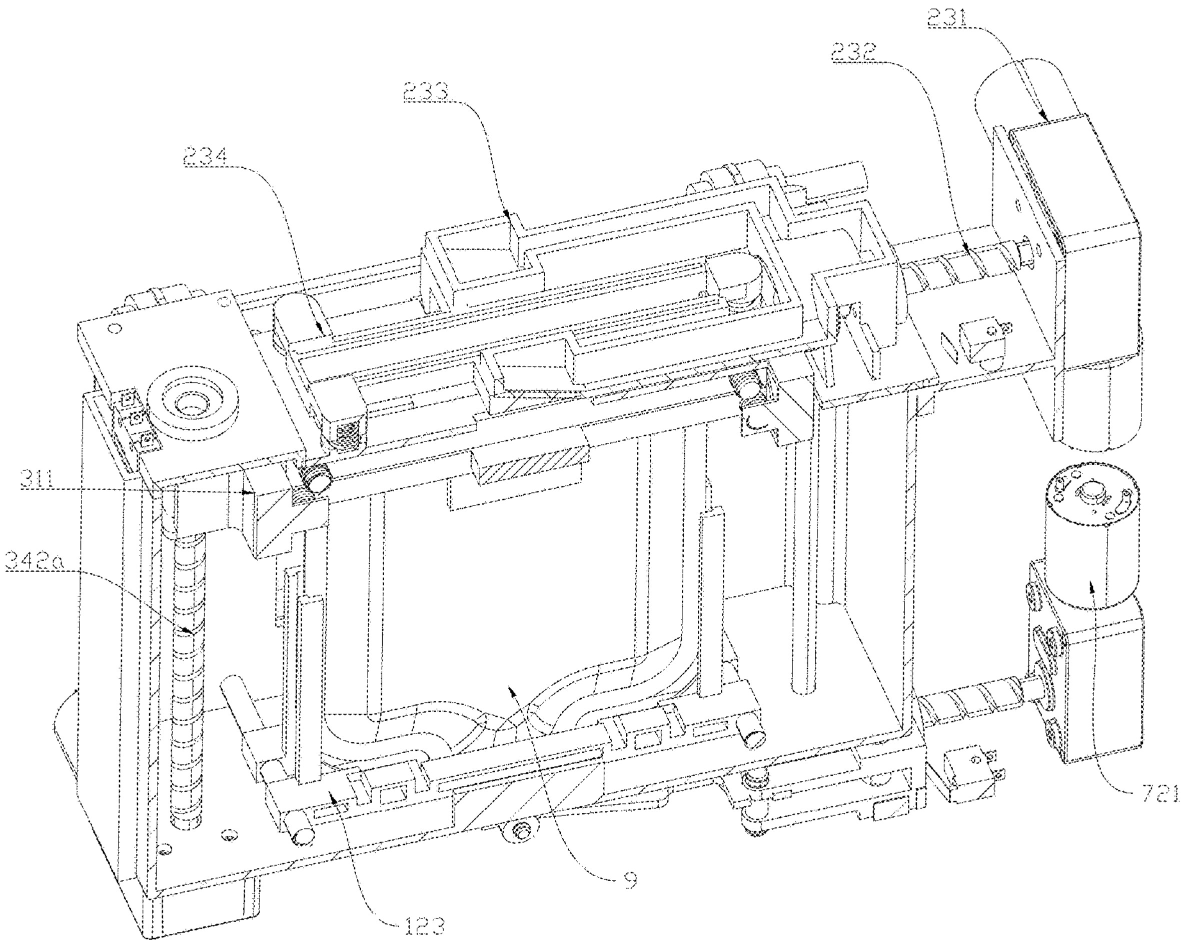
FIG. 14 is a schematic structural view of the two extruding portions inside a moving frame.

In one of the embodiments, as shown in FIG. 2, FIG. 3 and FIG. 8, the pack clamping mechanism 2 and the pack extruding mechanism 3 are both arranged on the moving frame 12. Specifically, the moving frame 12 is designed to be hollow on the inside, and the ingredient pack placement area 121 is located inside the moving frame 12.

The pack collecting bin 41 and the cooking mechanism 5 are preferably arranged side by side. The pack collecting bin 41 can be designed as a sliding drawer that moves in and out of the machine body 1, thereby facilitating for the user to take it out. The moving frame 12 includes a second position 43 located at an upper side of the cooking mechanism 5 and a first position 44 located at an upper side of the pack collecting bin 41.

The first driving assembly 42 is configured to drive the moving frame 12 to reciprocate between the second position 43 and the first position 44, so that after the pack extruding mechanism 3 completes the extrusion operation on the ingredient pack 9, the first driving assembly 42 drives the moving frame 12 to move from the second position 43 to the first position 44. Subsequently, the pack clamping mechanism 2 releases the empty ingredient pack 9, so that the empty ingredient pack 9 can fall into the pack collecting bin 41 under the force gravity. Afterwards, the first driving assembly 42 drives the moving frame 12 back to the second position, so that users can place a new ingredient pack 9 into the ingredient pack placement area 121 to continue cooking. In this way, the machine automatically completes the process of clamping the ingredient pack 9, breaking the package, extruding the ingredients in the ingredient pack 9, and recycling the empty ingredient pack 9, which can achieve a higher level of production automation.

Figure 20:
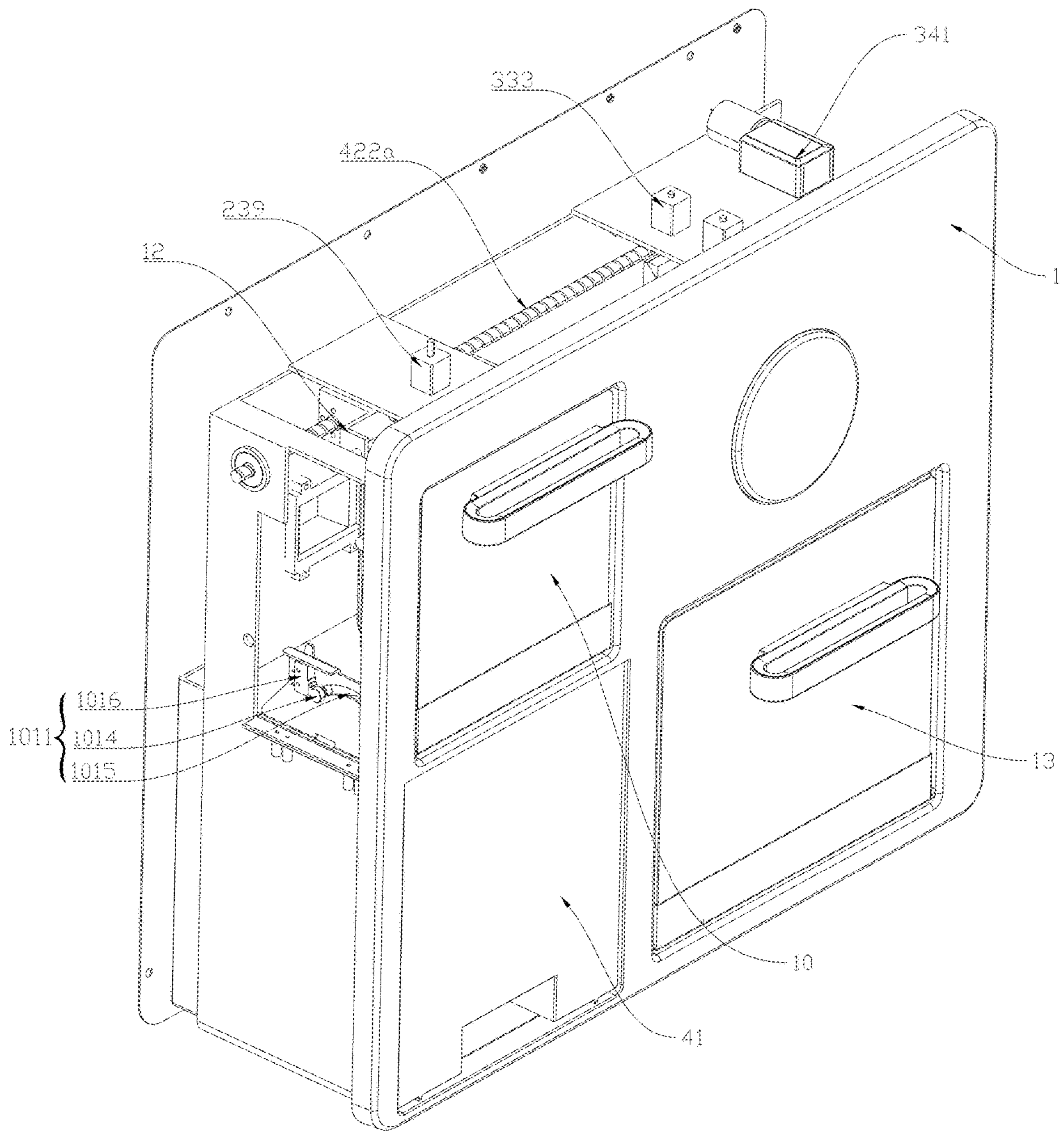
FIG. 20 is a schematic structural view of an ingredient pack door.
Figure 21:
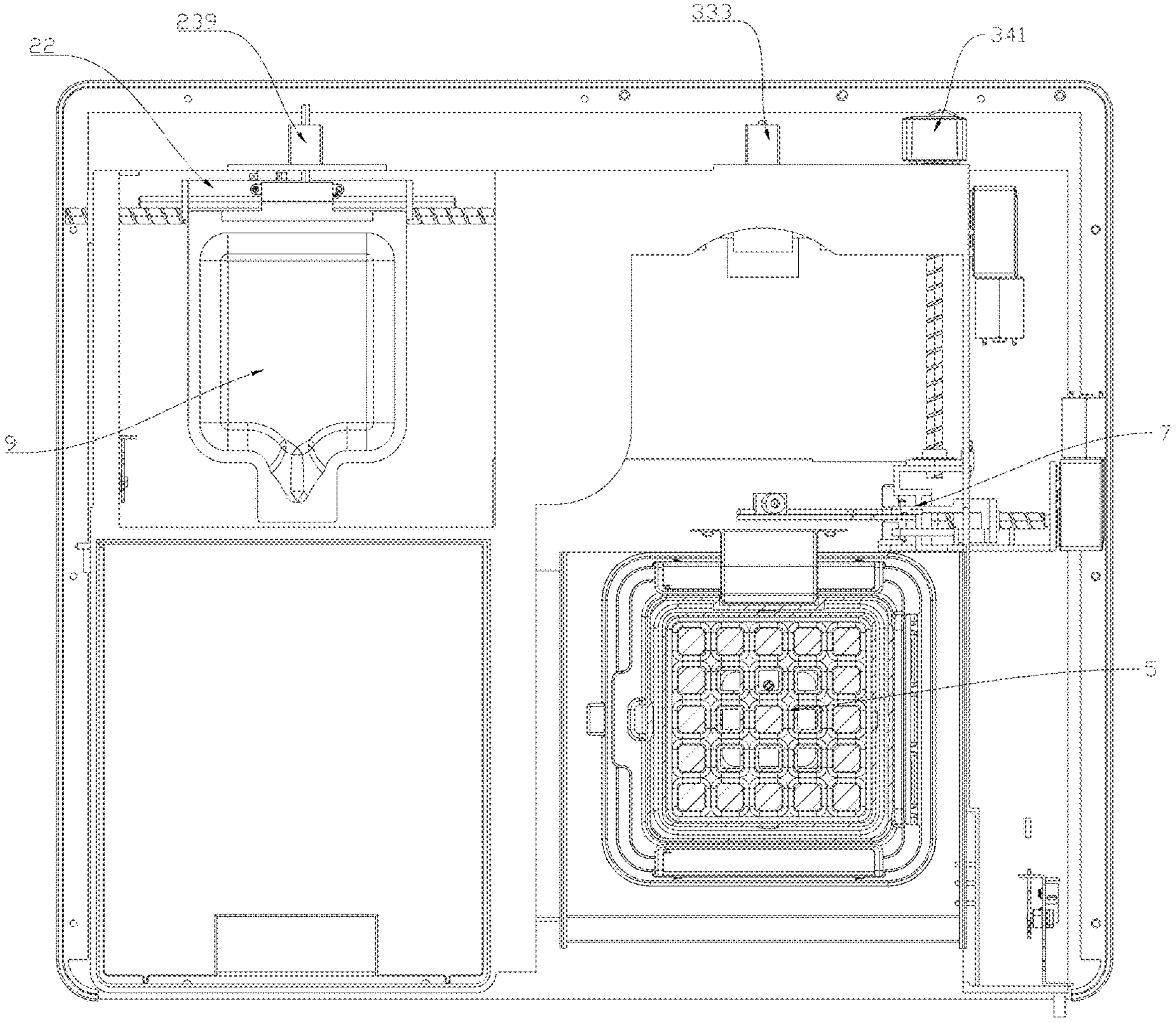
FIG. 21 is a cross-sectional schematic view showing the pack clamping mechanism mounted on the moving frame and located at a first position.

In another embodiment, as shown in FIGS. 20-21, the clamping ingredient pack mechanism 2 is arranged on the moving frame 12. Specifically, when in used, the first driving assembly 42 drives the moving frame 12 from a second position 43 to a first position 44, the user then loads the ingredient pack 9 into the ingredient pack placement area 121 through the ingredient pack inlet 11. Subsequently, the pack clamping mechanism 2 clamps the ingredient pack 9, and the first driving assembly 42 drives the moving frame 12 to move to the second position 43 to perform the process of breaking the package and extruding the ingredient. After the extrusion is completed, the first driving assembly 42 drives the moving frame 12 to move to the second position 43, and then the pack clamping mechanism 2 removes the clamping of the empty ingredient pack 9, and the empty ingredient pack 9 can fall into the pack collecting bin 41, so that the user can load a new ingredient pack 9 for the next cycle.

Figure 22:
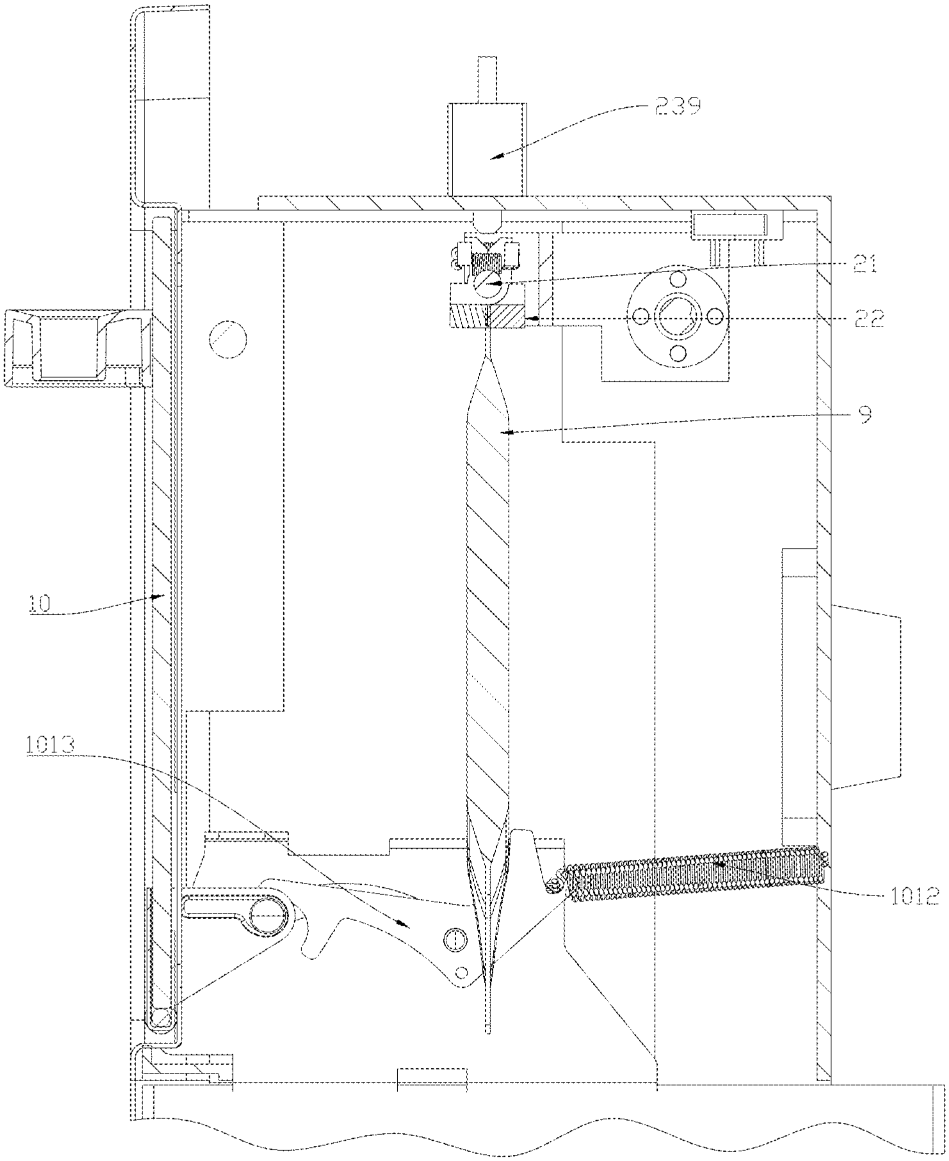
FIG. 22 is a schematic structural view of a door closing assembly of the ingredient pack door.
Figure 23:
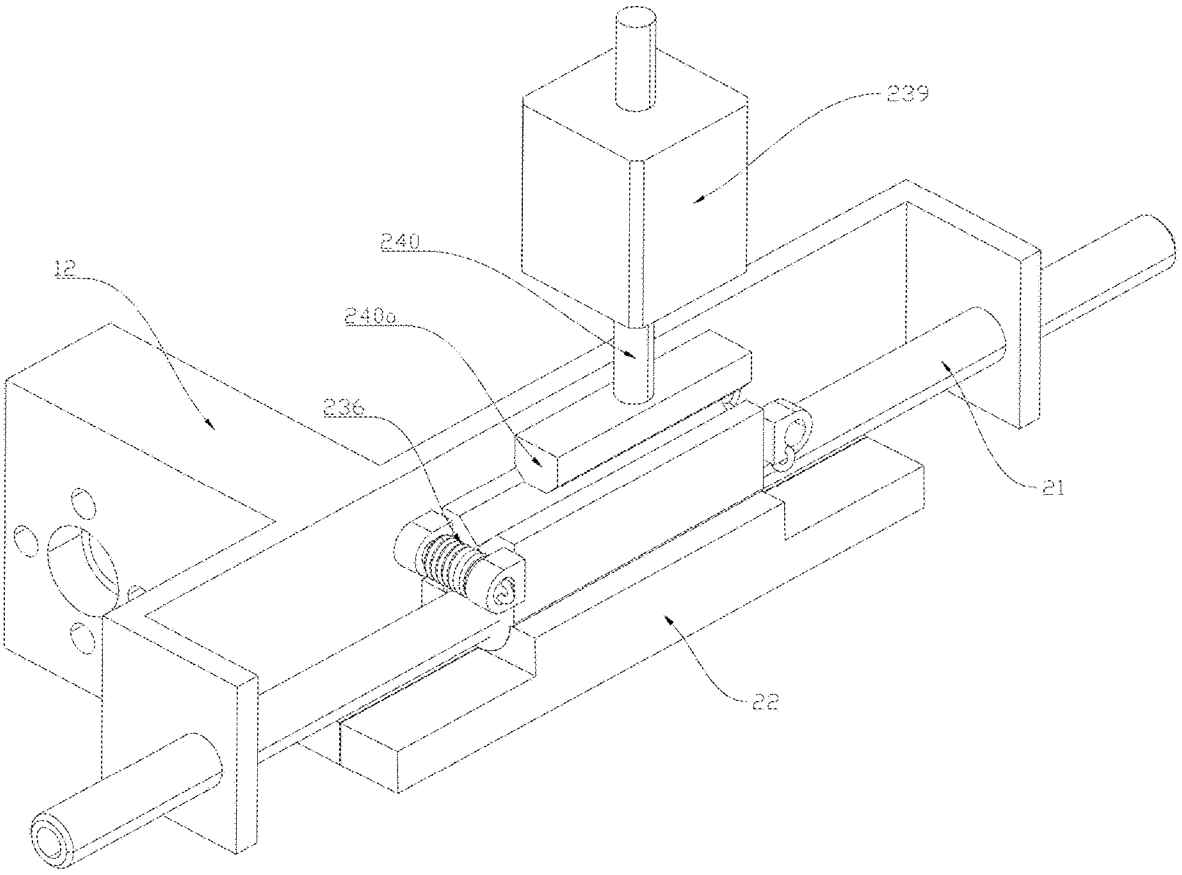
FIG. 23 is a schematic structural view of the pack clamping mechanism and a first electromagnet.
Figure 24:
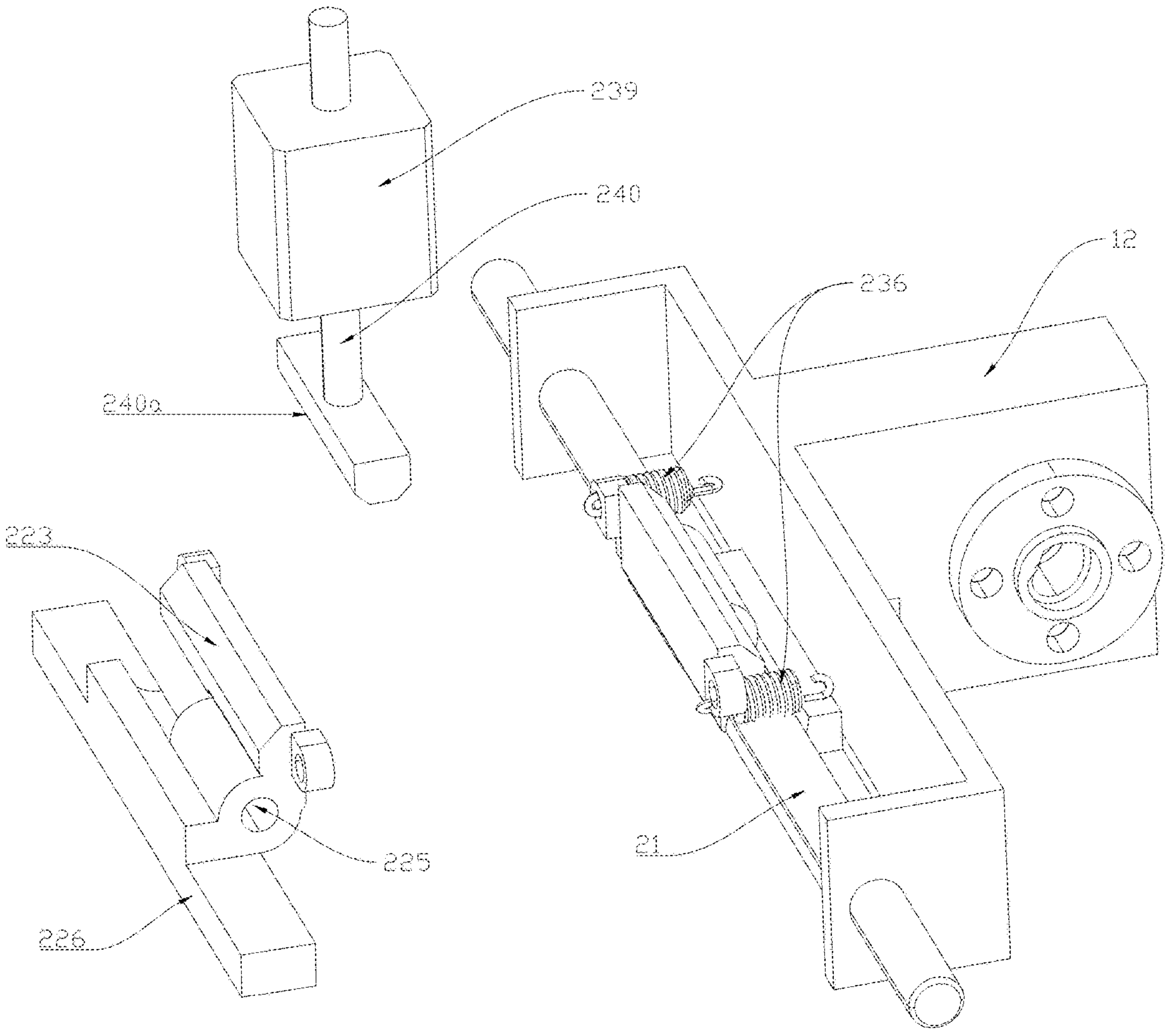
FIG. 24 is an exploded schematic of the pack clamping mechanism and the first electromagnet.
Figure 25:
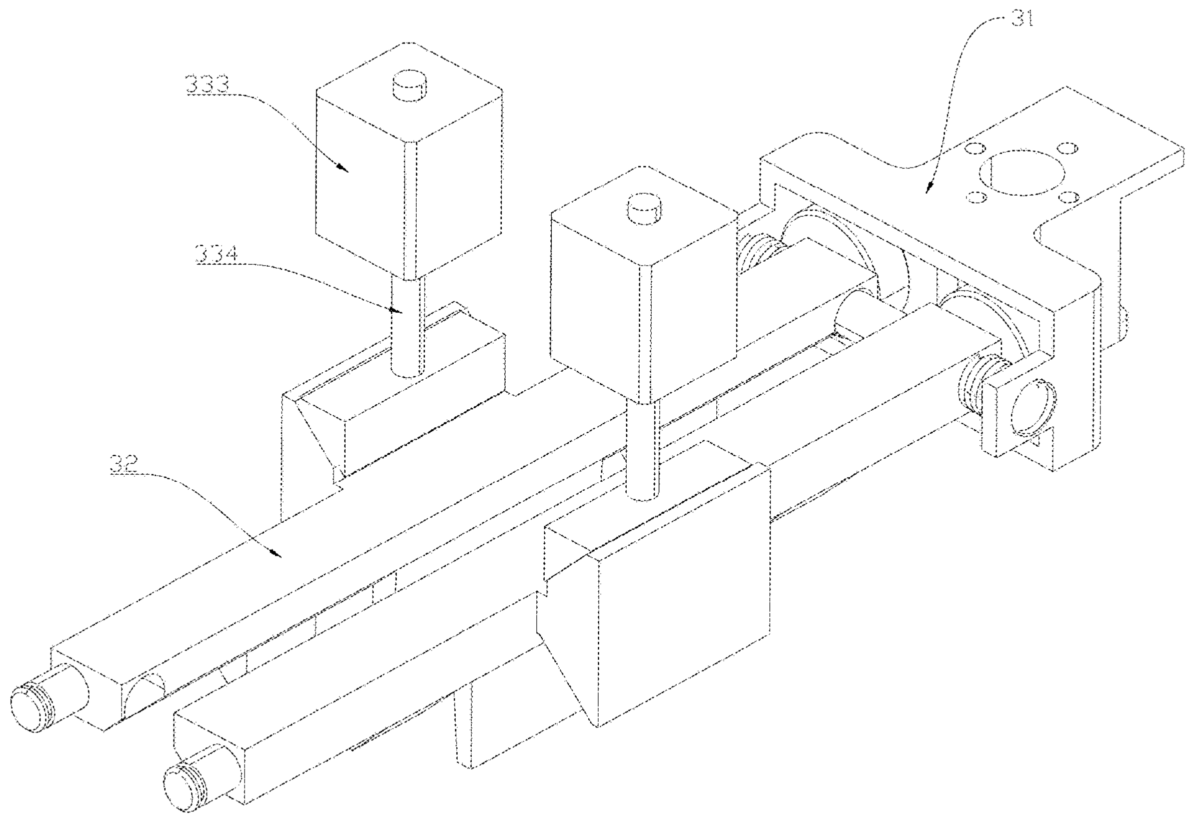
FIG. 25 is a schematic structural view of the pack extruding mechanism and a second electromagnet.
Figure 26:
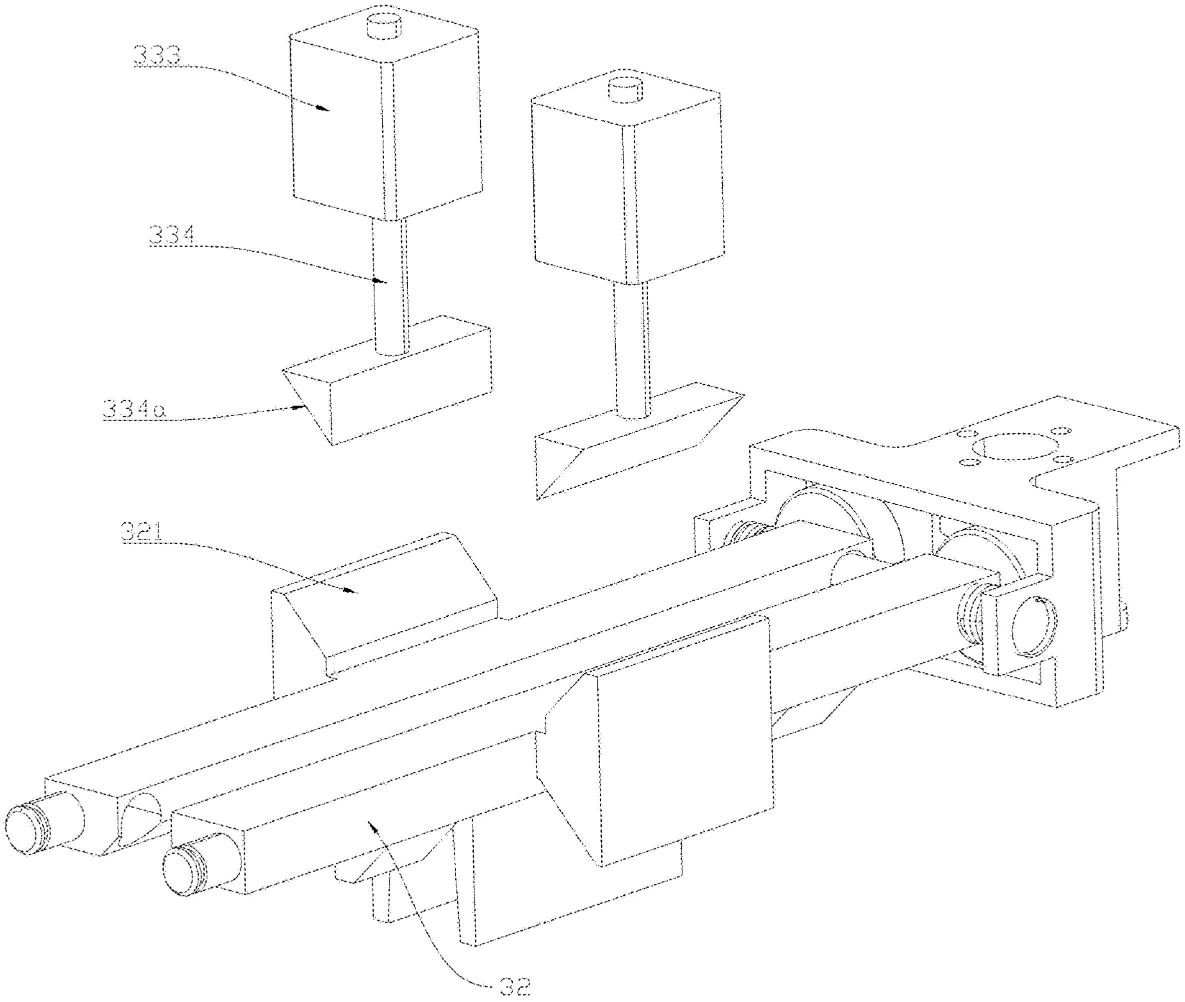
FIG. 26 is an exploded schematic of the pack extruding mechanism and the second electromagnet.

In some specific implementations, as shown in FIGS. 20-22, when the pack clamping mechanism 2 is arranged on the moving frame 12, in order to facilitate the user to add the ingredient pack 9, the ingredient pack inlet 11 is arranged adjacent to the first position 44. The machine body 1 is provided with an ingredient pack door 10 for opening and closing the ingredient pack inlet 11, and the ingredient pack door 10 is rotatably connected to the machine body 1. Specifically, the ingredient pack door 10 is located on a front side of the machine body 1 and on an upper side of the pack collecting bin 41.

A door closing assembly 1011 is provided between the ingredient pack door 10 and the machine body 1, wherein the door closing assembly 1011 includes:

- a first connecting rack 1013, wherein one end of the first connecting rack 1013 is hinged to the ingredient pack door 10, a first tension spring 1012 is provided between the other end of the first connecting rack 1013 and the machine body 1, and an eighth triggering portion 1014 is provided on the first connecting rack 1013;
- a first curved guide portion 1015, arranged on the machine body 1, wherein the eighth triggering portion 1014 is slidably connected with the first curved guide portion 1015; and
- a twelfth microswitch 1016, arranged on the machine body 1, wherein when the ingredient pack door 10 is closed, the eighth triggering portion 1014 activates the twelfth microswitch 1016.

As a specific structure of the first driving assembly 42, the first driving assembly 42 includes a first motor 421 and a first transmission assembly 422. An output end of the first motor 421 is connected to an input end of the first transmission assembly 422, and an output end of the first transmission assembly 422 is connected to the moving frame 12.

The moving frame 12 is provided with a first triggering portion 124. The machine body 1 is provided with a first microswitch 423 and a second microswitch 424 located on opposite sides of the first triggering portion 124.

When the first motor 421 drives the moving frame 12 to move toward the first microswitch 423 through the first transmission assembly 422 and the first triggering portion 124 activates the first microswitch 423, the first motor 421 stops and the moving frame 12 is located at the first position 44. At this time, the pack clamping mechanism 2 starts and releases the ingredient pack 9, and thus the empty ingredient pack 9 falls into the pack collecting bin 41 under the force of gravity. When the first motor 421 drives the moving frame 12 to move toward the second microswitch 424 through the first transmission assembly 422 and the first triggering portion 124 activates the second microswitch 424, the first motor 421 stops and the moving frame 12 is located at the second position 43.

As a specific embodiment of the first transmission assembly 422, the first transmission assembly 422 includes a first lead screw **422*a*, a first nut seat 422*b*, and multiple first guide rods 422*c*. An output end of the first motor 421 is connected to the first lead screw 422*a*, and the first nut seat 422*b* is threadedly connected to the first lead screw 422*a*. The moving frame 12 is fixedly connected to the first nut seat 422*b* and slidably connected with the multiple first guide rods 422*c***.

In some specific embodiments, as shown in FIGS. 2-5, FIGS. 9-10, and FIG. 14, the pack clamping mechanism 2 includes two clamping portions 22. The machine body 1 is provided with a first mounting portion 21, and the first mounting portion 21 is specifically arranged at an upper end of the moving frame 12. The two clamping portions 22 are both arranged on the first mounting portion 21 and respectively located on opposite sides of the first mounting portion 21, specifically, front and rear sides. The two clamping portions 2 are movably arranged on the first mounting portion 21 along a front-rear direction. The two clamping portions 22 have a clamping state where they approach each other along a front-rear direction and clamp the ingredient pack 9, and a releasing state where they move away from each other and disengage from the ingredient pack 9. In the clamping state, they specifically clamp the upper end of the ingredient pack 9.

The pack clamping mechanism 2 further includes a second driving assembly 23 configured to drive the two clamping portions 22 to switch between the clamping state and the loosening state.

Specifically, the two clamping portions 22 can be slidably arranged on the first mounting portion 21, and the two clamping portions 22 can be switched to the clamping state by sliding closer to each other, and to the releasing state by sliding away from each other. Alternatively, the two clamping portions 22 can be rotatably arranged on the first mounting base 21, and the two clamping portions 22 can be switched to the clamping state by rotating closer to each other, and to the releasing state by rotating away from each other.

Specifically, in one of the embodiments, as shown in FIGS. 2-5, FIGS. 9-10 and FIG. 14, both of the clamping portions 22 are slidably arranged on the first mounting portion 21 along a front-rear direction. The second driving assembly 23 includes:

- a second motor 231, specifically arranged on the moving frame 12;

- a second lead screw 232, arranged on an output end of the second motor 231, specifically arranged extending along the left and right directions;
- a second nut seat 233, threadedly connected to the second lead screw 232; wherein a lower side of the second nut seat 233 is provided with a first inclined surface 233*a*, and the second nut seat 233 is further provided with a second triggering portion 233*b*, specifically front and rear first inclined surfaces 233*a*, and the second nut seat 233 is further provided with a second triggering portion 233*b;*
- a third microswitch 237 and a fourth microswitch 238, arranged on the machine body 1 and respectively located on opposite sides of the second nut seat 233. Specifically, the third microswitch 237 is located on a left side of the second nut seat 233, and the fourth microswitch 238 is located on a right side of the second nut seat 233;
- a linkage member 234, slidably arranged on the first mounting portion 21 in a vertical direction, wherein a resetting assembly 235 for linkage member is provided between the linkage member 234 and the first mounting portion 21; the resetting assembly 235 includes several first reset springs, and each first reset spring is arranged between the linkage member 234 and the first mounting portion 21; an upper side of the linkage member 234 is provided with a second inclined surface 234*a* that abuts against the first inclined surface 233*a*, specifically, there are two second inclined surfaces 234*a*, and the two second inclined surfaces 234*a* abut against the two first inclined surfaces 233*a* respectively; and a lower side of the linkage member 234 is provided with two third inclined surfaces 234*b*, the two third inclined surfaces 234*b* are respectively located on the front and rear sides of the lower portion of the linkage member 234; each of the clamping portions 22 is provided with a fourth inclined surface 221, and the two third inclined surfaces 234*b* abut against the two fourth inclined surfaces 221 respectively; each of the clamping portions 22 is provided with a fourth inclined surface 221 at its left and right ends; and
- a first elastic assembly 236, arranged on the first mounting portion 21 and configured to drive the two clamping portions 22 to approach each other.

When the second motor 231 drives the second nut seat 233 to move toward the third microswitch 237 through the second lead screw 232, the second nut seat 233 drives the linkage member 234 to move downward through the cooperation of the first inclined surface 233*a* and the second inclined surface 234*a*, and the linkage member 234 drives the two clamping portions 22 to move away from each other and simultaneously stores energy in the resetting assembly 235 and the first elastic assembly 236 through the cooperation of the two third inclined surfaces 234*b* and the two fourth inclined surfaces 221. When the second triggering portion 233*b* activates the third microswitch 237, the second motor 231 stops, and the two clamping portions 22 are switched to the loosening state.

When the second motor 231 drives the second nut seat 233 to move toward the fourth microswitch 238 through the second lead screw 232, under the reset action of the resetting assembly 235 and the first elastic assembly 236, the linkage member 234 moves upward to reset and the two clamping portions 22 approach each other. When the second triggering portion 233*b* activates the fourth microswitch 238, the second motor 231 stops, and the two clamping portions 22 are switched to the clamping state.

To further simplify the structure and enable a single driving assembly to simultaneously drive both the clamping portions 22 and the extruding portions 32, the pack extruding mechanism 3 includes two extruding portions 32. The machine body 1 is further provided with a second mounting portion 31. Specifically, the second mounting portion 31 is slidably arranged on the moving frame 12 in a vertical manner. Both of the two extruding portions 32 are arranged on the second mounting portion 31 and located on opposite sides of the second mounting portion 31, specifically, front and rear sides. Moreover, the two extruding portions 32 are respectively located at lower sides of the two clamping portions 22.

The two extruding portions 32 have an extruding state where they approach each other to clamp the ingredient pack 9, and a disengaging state where they move away from each other to disengage from the ingredient pack 9. The second mounting portion 31 is provided with a second elastic assembly 331 configured to drive the two extruding portions 32 to approach each other.

The lower side of the linkage member 234 is further provided with two fifth inclined surfaces 234*c*, each of the extruding portions 32 is provided with a sixth inclined surface 321, and the two fifth inclined surfaces 234*c* abut against the two sixth inclined surfaces 321 respectively.

When the second motor 231 drives the second nut seat 233 to move toward the third microswitch 237 through the second lead screw 232, the second nut seat 233 drives the linkage member 234 to move downward through the cooperation of the first inclined surface 233*a* and the second inclined surface 234*a*, the linkage member 234 drives the two extruding portions 32 to move away from each other through the cooperation of the two fifth inclined surfaces 234*c* and the two sixth inclined surfaces 321 and simultaneously stores energy in the resetting assembly 235 and the second elastic assembly 331. When the second triggering portion 233*b* activates the third microswitch 237, the second motor 231 stops, and the two extruding portions 32 are switched to the disengaging state.

When the second motor 231 drives the second nut seat 233 to move toward the fourth microswitch 238 through the second lead screw 232, under the reset action of the resetting assembly 235 and the second elastic assembly 331, the linkage member 234 moves upward to reset and the two extruding portions 32 approach each other. When the second triggering portion 233*b* activates the fourth microswitch 238, the second motor 23 stops, and the two extruding portions 32 are switched to the extruding state.

In some specific embodiments, the first elastic assembly 236 includes two sets of first springs 236*a*; each set of the first springs 236*a* is arranged between its corresponding clamping portion 22 and the first mounting portion 21. Each set of the first springs 236*a* includes two first springs 236*a*, wherein one is located between the left end of the clamping portion 22 and the first mounting portion 21, and the other is located between the right end of the clamping portion 22 and the first mounting assembly 21, so that the clamping portion is evenly stressed. Each of the clamping portions 22 is slidably connected to the first mounting portion 21 through left and right guide poles 222, and the first spring 236*a* is sleeved on its corresponding guide pole 222.

In some specific embodiments, the second elastic assembly 331 includes two sets of second springs 331*a*; each set of the second springs is arranged between its corresponding extruding portion 32 and the second mounting portion 31. Each set of the second springs 331*a* includes two second springs 331*a*, wherein one is located between the left end of the extruding portion 32 and the second mounting portion 31, and the other is located between the right end of the extruding portion 32 and the second mounting portion 31, so that the extruding portion 32 is evenly stressed.

In another specific embodiment, as shown in FIGS. 20-24, middle portion of each of the clamping portions 22 is hingedly connected to the first mounting portion 21, and two opposite sides of each of the clamping portions 22 are respectively provided with a first abutting portion 223 and a clamping plate 224. Specifically, the middle portion of each of the clamping portions 22 is provided with a hinging portion 225, which is hingedly connected to the first mounting portion 21. The first mounting portion 21 is fixedly arranged on the moving frame 12.

The second driving assembly 23 includes a first electromagnet 239 and a first iron core 240 slidably arranged on the first electromagnet 239. A lower side of the first iron core 240 is provided with a first driving part **240*a*, whose diameter gradually increases from bottom to top. A clearance space is provided between the two first abutting portions 223, and the first elastic assembly 236 is arranged between the two first abutting portions 223. The clearance space is convenient for the first driving part 240*a* to abut against the two first abutting portions 223, thereby driving them to be separated from each other. Specifically, the first driving part 240*a* and the two first abutting portions 223 can cooperate with each other through inclined surfaces. The first elastic assembly 236 is specifically configured as two first springs 236*a*, which are arranged between the two first abutting portions 223. The two clamping plates 224 can be specifically configured to clamp the upper end of the ingredient pack 9**.

When the first electromagnet 239 is energized, the first iron core 240 moves toward the space between the two first abutting portions 223. The first driving part **240*a* drives the two clamping portions 22 to rotate relative to the first mounting portion 21*by* abutting against the two first abutting portions 223, thereby separating the two clamping plates 224 from each other. Meanwhile, the first elastic assembly 236 stores energy, and the two clamping portions 22** are switched to the releasing state.

When the first electromagnet 239 is not energized, the first iron core 240 moves away from the clamping portions 22 and resets to its initial position. Under the restoring force of the first elastic assembly 236, the two clamping portions 22 rotate relative to the first mounting portion 21, causing the two clamping plates 224 to approach each other and the two first abutting portions 223 to approach each other, so that the two clamping portions 22 are switched to the clamping state.

In some specific embodiments, as shown in FIGS. 2-14, the pack extruding mechanism 3 includes two extruding portions 32. The machine body 1 is further provided with a second mounting portion 31, and the two extruding portions 32 are both arranged on the second mounting portion 31 and respectively located on opposite sides of the second mounting portion 31, specifically on the front and rear sides.

The two extruding portions 32 have an extruding state where they approach each other and clamp the ingredient pack 9, and a disengaging state where they move away from each other and disengage from the ingredient pack 9.

The pack extruding mechanism 3 further includes a third driving assembly 33 configured to drive the two extruding portions 32 to switch between the extruding state and the disengaging state; and a fourth driving assembly 34 configured to drive the two extruding portions 32 to move from top to bottom in the extruding state to extrude the ingredient from the ingredient pack 9.

In one of the specific embodiments, as shown in FIGS. 2-14, the third driving assembly 33 includes:

a second motor 231;

a second lead screw 232, arranged on an output end of the second motor 231;

a second nut seat 233, threadedly connected to the second lead screw 23, wherein a lower side of the second nut seat 233 is provided with a first inclined surface **233*a*, and the second nut seat 233 is further provided with a second triggering portion 233*b;*** a third microswitch 237 and a fourth microswitch 238, arranged on the machine body 1 and respectively located on opposite sides of the second nut seat 233;

a linkage member 234, slidably arranged on the machine body 1 in a vertical direction, wherein a resetting assembly 235 for linkage member is provided between the linkage member 234 and the machine body 1; an upper side of the linkage member 234 is provided with a second inclined surface **234*a* that abuts against the first inclined surface 233*a*, and a lower side of the linkage member 234 is further provided with two fifth inclined surfaces 234*c*; each of the extruding portions 32 is provided with a sixth inclined surface 321, and the two fifth inclined surfaces 234*c* abut against the two sixth inclined surfaces 321 respectively; and a second elastic assembly 331, arranged on the second mounting portion 31 and configured to drive the two extruding portions 32** to approach each other.

When the second motor 231 drives the second nut seat 233 to move toward the third microswitch 237 through the second lead screw 232, the second nut seat 233 drives the linkage member 234 to move downward through the cooperation of the first inclined surface **233*a* and the second inclined surface 234*a*, and the linkage member 234 drives the two extruding portions 32 to move away from each other and simultaneously stores energy in the resetting assembly 235 and the second elastic assembly 331 through the cooperation of the two fifth inclined surfaces 234*c* and the two sixth inclined surfaces 321. When the second triggering portion 233*b* activates the third microswitch 237, the second motor 231 stops, and the two extruding portions 32** are switched to the disengaging state.

When the second motor 231 drives the second nut seat 233 to move toward the fourth microswitch 238 through the second lead screw 232, under the reset action of the resetting assembly 235 and the second elastic assembly 331, the linkage member 234 moves upward to reset and the two extruding portions 32 approach each other. When the second triggering portion **233*b* activates the fourth microswitch 238, the second motor 231 stops, and the two extruding portions 32** are switched to the extruding state.

In another specific embodiment, as shown in FIGS. 20-21 and FIGS. 25-26, the third driving assembly 33 includes:

two second electromagnets 333, wherein each of the second electromagnets 333 is slidably provided with a second iron core 334 that moves vertically. A lower side of each of the second iron cores 334 is provided with an eleventh inclined surface **334*a*, and an upper side of each of the extruding portions 32 is provided with a sixth inclined surface 321; and a second elastic assembly 331, arranged on the second mounting portion 31 and configured to drive the two extruding portions 32** to approach each other.

When the two second electromagnets 333 are not energized, the two second iron cores 334 move toward the two extruding portions 32 respectively, and the two eleventh inclined surfaces 334 a slide along the two sixth inclined surfaces 321 respectively to drive the two extruding portions 32 to move away from each other and switch to the disengaging state, while the second elastic assembly 331 stores energy.

When the two second electromagnets 333 are energized, the two second iron cores 334 move away from the extruding portions 32 respectively and reset to their initial positions. Under the restoring force of the second elastic assembly 331, the two extruding portions 32 approach each other and switch to the extruding state.

The third driving assembly 33 further includes two seventh inclined surfaces 332 arranged on opposite sides of the machine body 1. Specifically, the seventh inclined surface 332 is arranged on the moving frame 12 and located at the bottom of the ingredient pack placement area 121. A lower side of each of the extruding portions 32 is provided with an eighth inclined surface 322.

When the fourth driving assembly 34 drives the two extruding portions 32 to move from top to bottom to a lower end of the ingredient pack placement area 121, the two eighth inclined surfaces 322 slide along the two seventh inclined surfaces 332 respectively to force the two extruding portions 32 to move away from each other to switch to the disengaging state and store energy in the second elastic assembly 331. Specifically, after completing the ingredient extrusion process, the two extruding portions 32 are separated from each other, thereby facilitating disposal of the empty ingredient packs 9.

The fourth driving assembly 34 includes a fourth motor 341 and a fourth transmission assembly 342, the fourth motor 341 is connected to an input end of the fourth transmission assembly 342, and an output end of the fourth transmission assembly 342 is connected to the second mounting portion 31.

The second mounting portion 31 is provided with a fourth triggering portion 313, the machine body 1 is provided with a fifth microswitch 343 located on an upper side the fourth triggering portion 313, and a sixth microswitch 344 located on a lower side the fourth triggering portion 313.

When the fourth motor 341 drives the second mounting portion 31 and the two extruding portions 32 to move from top to bottom through the fourth transmission assembly 342 until the fourth triggering portion 313 activates the sixth microswitch 344, the fourth motor 341 stops. When the fourth motor 341 drives the second mounting portion 31 and the two extruding portions 32 to move from bottom to top through the fourth transmission assembly 342 until the fourth triggering portion 313 activates the fifth microswitch 343, the fourth motor 341 stops.

Specifically, the fourth transmission assembly 34 includes a fourth lead screw 342*a* and a fourth guide rod 342*b*. The fourth lead screw 342*a* is connected to an output end of the fourth motor 341. The second mounting portion 31 includes a right second mounting portion 312 threadedly connected to the fourth lead screw 342*a* and a left second mounting portion 311 slidably connected to the fourth guide rod 342*b*. Left and right ends of each of the extruding portions 32 are respectively connected to the left second mounting portion 311 and the right second mounting portion 312, specifically through rollers 323 that enable front-to-back rolling connection.

Figure 7:
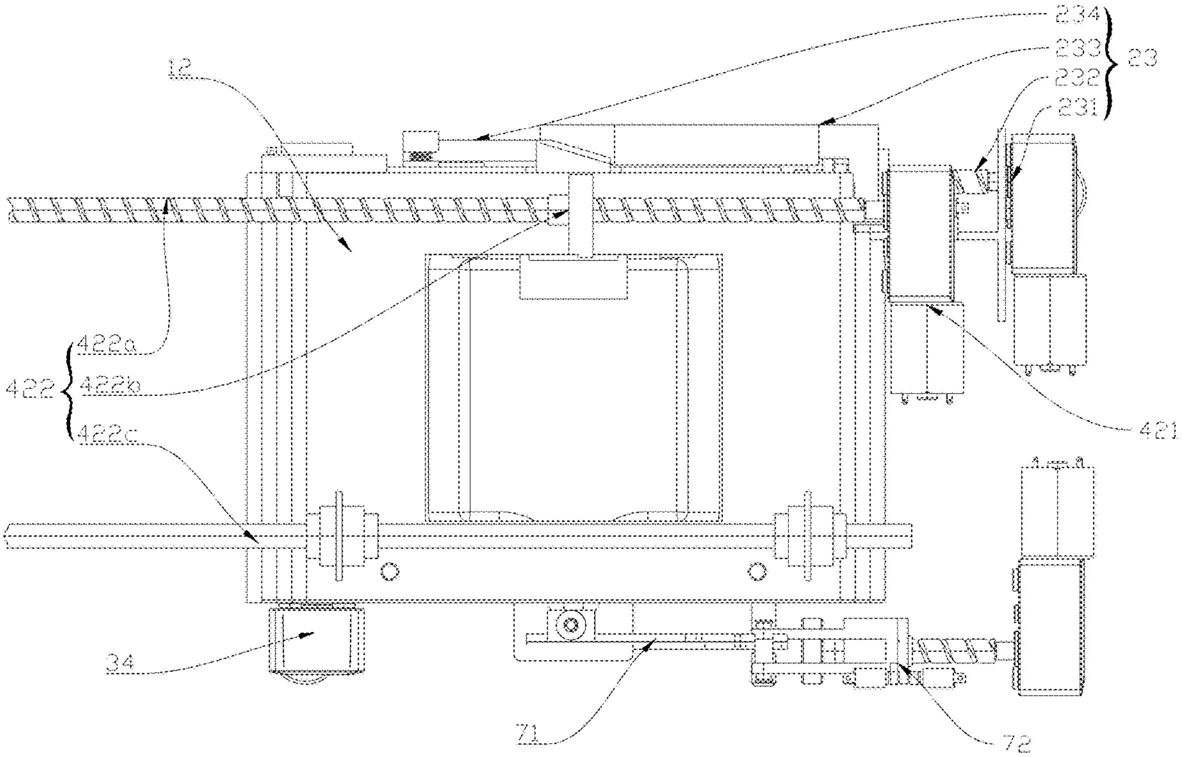
FIG. 7 is a schematic structural view of a pack recycling mechanism and a pack-breaking mechanism from a first perspective.
Figure 15:
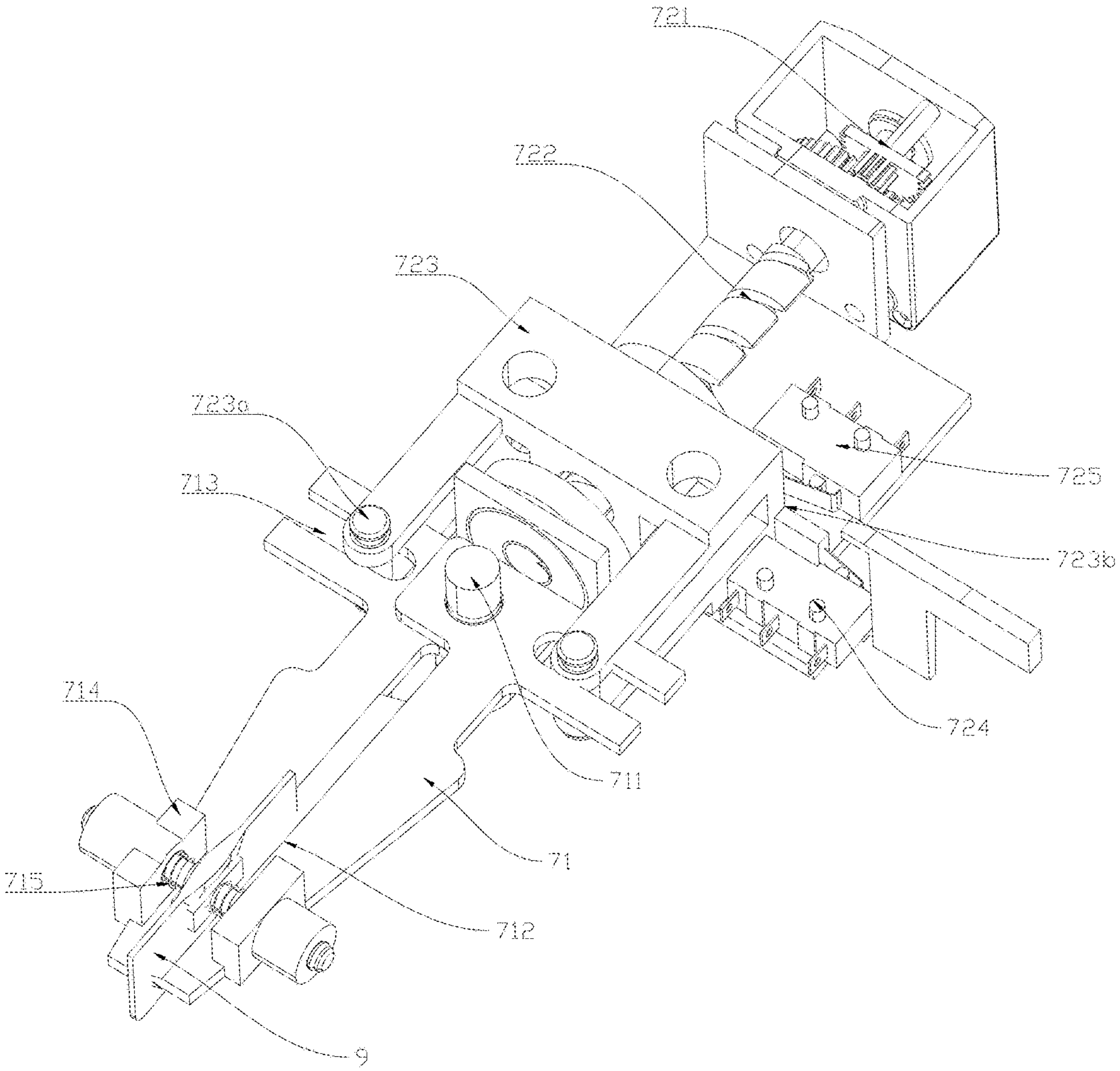
FIG. 15 is a schematic structural view of the pack-breaking mechanism.
Figure 16:
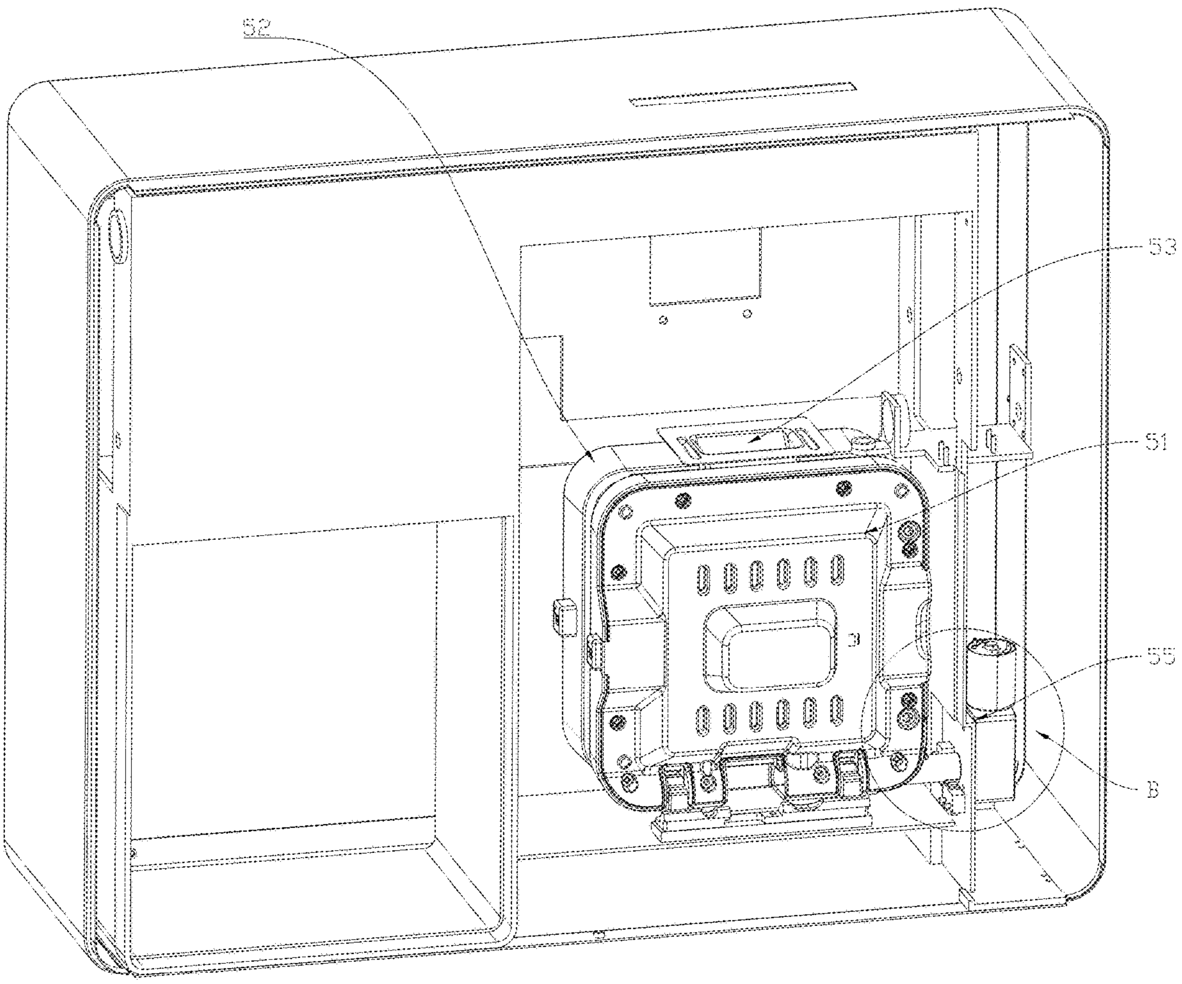
FIG. 16 is a schematic structural view of a cooking mechanism.
Figure 17:
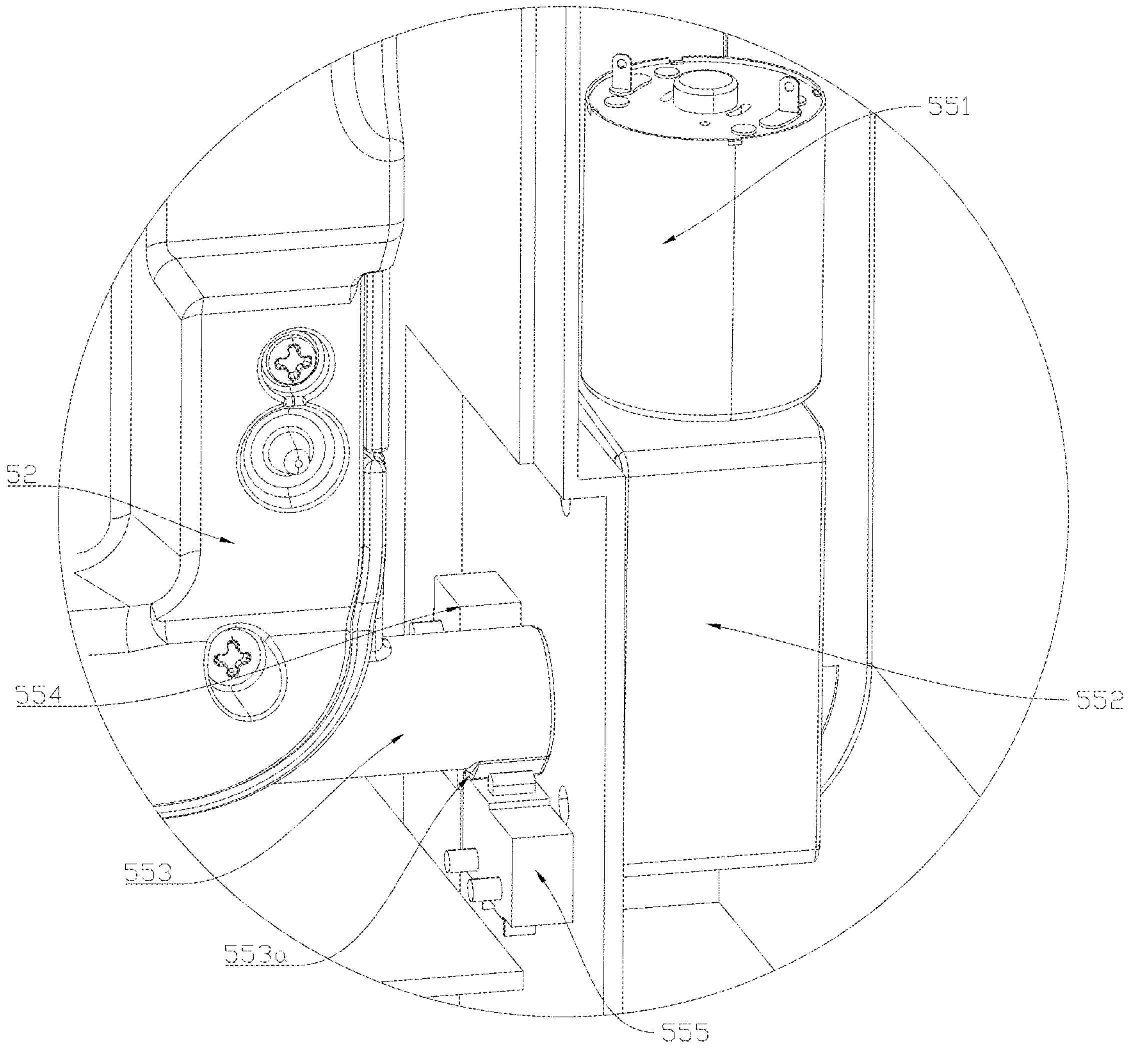
FIG. 17 is an enlarged structural view of a switching mechanism at Part B in FIG. 16.

In some specific embodiments, as shown in FIGS. 7-8 and FIG. 15, the pack-breaking mechanism 7 includes two scissor heads 71 arranged opposite to each other, and each of the scissor heads 71 is provided with a cutting portion 712. The two cutting portions 712 have a cutting state and a non-cutting state. The pack-breaking mechanism 7 further includes a fifth driving assembly 72 configured to drive the cutting portions 712 on the two scissor heads 71 to switch between the cutting state and the non-cutting state.

The fifth driving assembly 72 includes a fifth motor 721, a fifth lead screw 722, and a fifth nut seat 723. The fifth motor 721 is drivingly connected to the fifth lead screw 722, and the fifth nut seat 723 is threadedly connected to the fifth lead screw 722.

Each of the scissor heads 71 is provided with a scissor head guide portion 713 at an end away from its cutting portion 712. The fifth nut seat 723 is provided with two sliding portions 723*a*, which are slidably connected to the two scissor head guide portions 713, respectively. The machine body 1 is provided with a scissor head rotating shaft 711, and each of the scissor heads 71 is rotatably connected to the scissor head rotating shaft 711 at an end away from the cutting portion 712.

The fifth nut seat 723 is provided with a fifth triggering portion 723*b*, and the machine body 1 is provided with a seventh microswitch 724 and an eighth microswitch 725 respectively located on opposite sides of the fifth triggering portion 723*b*.

When the fifth motor 721 drives the fifth nut seat 723 to move toward the seventh microswitch 724 through the fifth lead screw 722, the fifth nut seat 723 drives the two sliding portions 723*a* to slide closer to each other along the two scissor head guide portions 713 respectively, thereby bringing the two cutting portions 712 together to switch to the cutting state; when the fifth triggering portion 723*b* activates the seventh microswitch 724, the fifth motor 721 stops. When the fifth motor 721 drives the fifth nut seat 723 to move toward the eighth microswitch 725 through the fifth lead screw 722, the fifth nut seat 723 drives the two sliding portions 723*a* to slide away from each other along the two scissor head guide portions 713 respectively, thereby separating the two cutting portions 712 to switch to the non-cutting state. When the fifth triggering portion 723*b* activates the eighth microswitch 725, the fifth motor 721 stops. When the lower end of the ingredient pack 9 is cut by the two cutting portions 712, it is set to be incompletely cut, so that the reduced part is still connected to the main body of the ingredient pack 9, preventing it from falling into the cooking chamber 54.

Each of the scissor heads 71 is provided with a pre-clamping pressure block 714 for clamping the ingredient pack 9, and the pre-clamping pressure block 714 is slidably arranged on its corresponding scissor head 71. A pressure block elastic resetting member 715, specifically a second reset spring, is arranged between the pre-clamping pressure block 714 and its corresponding scissor head 71.

During the process where the fifth driving assembly 72 drives the two cutting portions 712 from the non-cutting state to the cutting state, the two pre-clamping pressure blocks 714 first clamp the ingredient pack 9, and then the two cutting portions 712 further advance to execute cutting operation on the ingredient pack 9. During the process where the fifth driving assembly 72 drives the two cutting portions 712 from the cutting state back to the non-cutting state, the second return spring causes the two cutting portions 712 to separate away from each other prior to the two pre-clamping pressure blocks 714. That is, after the two cutting portions 712 separate away from each other, the two pre-clamping pressure blocks 714 separate from each other, which can prevent the ingredient from dropping on the cutting portions 712.

In some specific embodiments, as shown in FIG. 4, FIG. 6, FIG. 16 and FIG. 17, the cooking mechanism 5 includes a first baking pan 51 and a second baking pan 52 located on opposite sides. Specifically, the first baking pan 51 is located on a front side of the second baking pan 52. The first baking pan 51 has a closed state, where it cooperates with the second baking pan 52 to form a cooking chamber 54, and an open state, where it is flipped and opened away from the second baking pan 52. An upper side of the cooking chamber 54 is provided with a ingredient inlet 53 configured to receive the ingredient extruded from the ingredient pack 9, and the ingredient extruded from the ingredient pack 9 enters the cooking chamber 54 through ingredient inlet 53.

The ingredient pack placement area 121 is provided with an ingredient pack outlet 122 at its lower end. The pack-breaking mechanism 7 is arranged between the ingredient inlet 53 and the ingredient pack outlet 122.

A switching mechanism 55 is provided between the first baking pan 51 and the machine body 1 and configured to switch the first baking pan 51 between the closed state and the open state.

Specifically, the switching mechanism 55 includes a sixth motor 551, a sixth transmission assembly 552, and a sixth rotating shaft 553. An output end of the sixth motor 551 is connected to an input end of the sixth transmission assembly 552, an output end of the sixth transmission assembly 552 is connected to the sixth rotating shaft 553, and the sixth rotating shaft 553 is connected to the first baking pan 5.

The sixth rotating shaft 553 is provided with a sixth triggering portion **553*a*. The machine body 1 is provided with a ninth microswitch 554 and a tenth microswitch 555**.

When the sixth motor 551 drives the sixth rotating shaft 553 to rotate counterclockwise through the sixth transmission assembly 552 until the sixth triggering portion **553*a* activates the ninth micro switch 554, the sixth motor 551 stops and the first baking pan 51 is switched to the open state. When the sixth motor 551 drives the sixth rotating shaft 553 to rotate clockwise through the sixth transmission assembly 552 until the sixth triggering portion 553*a* activates the tenth microswitch 555, the sixth motor 551 stops and the first baking pan 51** is switched to the closed state.

The sixth transmission assembly 552 is specifically configured as a gear set, including several gears.

Figure 18:
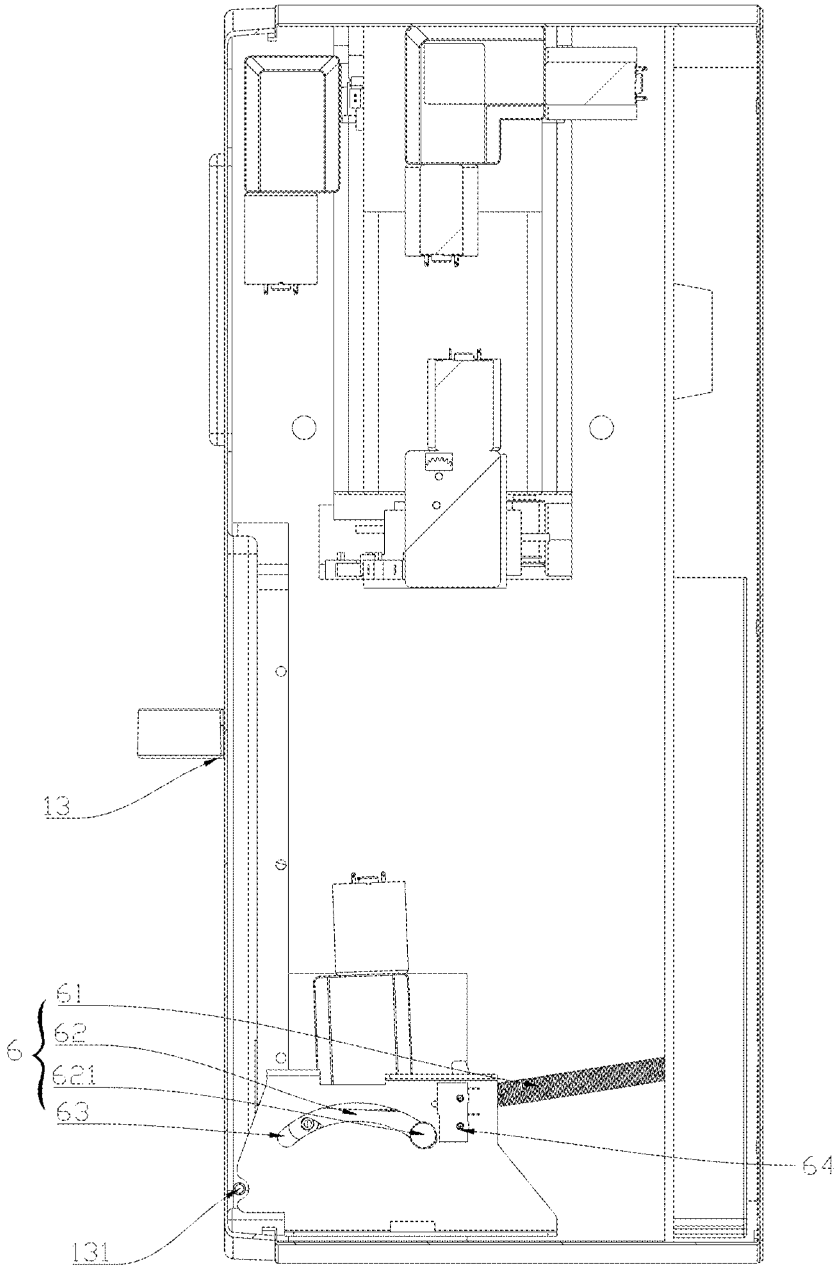
FIG. 18 is a schematic structural view of a door-closing mechanism from a first perspective.
Figure 19:
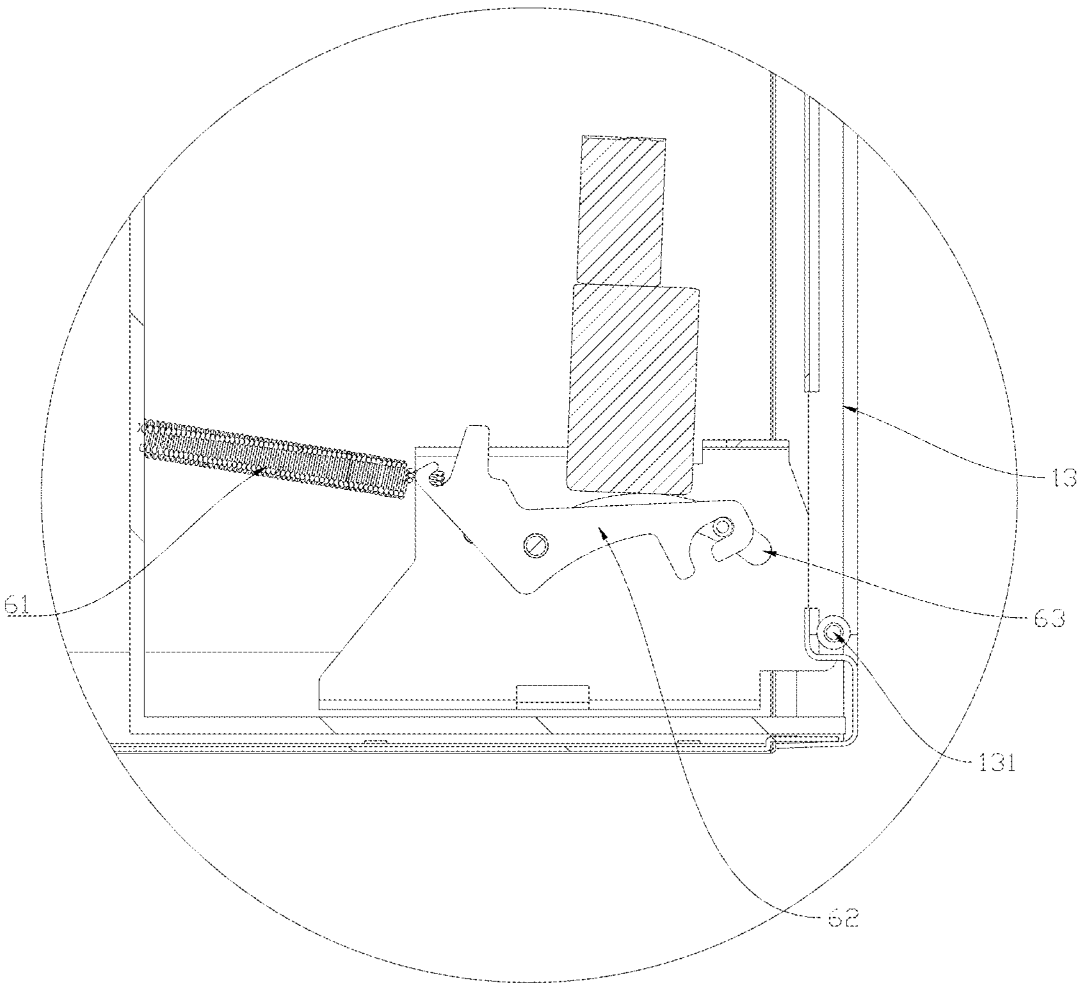
FIG. 19 is a schematic structural view of the door-closing mechanism from a second perspective.

In some specific embodiments, as shown in FIG. 1, FIG. 18 and FIG. 19, the baking machine further comprises a cooking mechanism door body 13 arranged on the cooking mechanism 5. Specifically, the cooking mechanism door body 13 is arranged on a front side of the first baking pan 51, and the cooking mechanism door body 13 is rotatably connected to the machine body 1 through a door shaft 131. The cooking mechanism door body 13 is located on the front side of the first baking pan 51, and the first baking pan 51 is provided with a second abutting portion 511 for abutting against the cooking mechanism door body 13. When the switching mechanism 55 drives the first baking pan 51 to switch to the opening state, the second abutting portion 511 drives the cooking mechanism door body 13 to open synchronously by abutting against the cooking mechanism door body 13, so that the operation safety is higher.

A door-closing mechanism 6 is provided between the cooking mechanism door body 13 and the machine body 1. The door-closing mechanism 6 includes:

- a second connecting rack 62, wherein one end of the second connecting rack 62 is hinged to the cooking mechanism door body 13, a second tension spring 61 is provided between the other end of the second connecting rack 62 and the machine body 1, and the second connecting rack 62 is provided with a seventh triggering portion 621;
- a second curved guide portion 63, arranged on the machine body 1, wherein the seventh triggering portion 621 is slidably connected to the second curved guide portion 63, and the second curved guide portion 63 is specifically a curved hole; and
- an eleventh microswitch 64, arranged on the machine body 1, wherein when the cooking mechanism door body 13 is closed, the seventh triggering portion 621 activates the eleventh microswitch 64. The cooperation between the seventh triggering portion and the eleventh microswitch not only ensures that the cooking mechanism door body 13 is closed in place, but also cuts off power during door opening, effectively preventing accidental door opening during high-temperature operation.

In some specific embodiments, as shown in FIG. 6, and FIGS. 11-14, the pack clamping frames 123 are respectively arranged on opposite sides at the bottom of the ingredient pack placement area 121, and the pack clamping frames 123 are slidably arranged on the machine body 1. Specifically, the two pack clamping frames 123 are located on front and rear sides of the ingredient pack placement area 121, respectively. Each of the pack clamping frames 123 includes a base support **123*a* and vertical frames 123*b* arranged on left and right ends of the base support 123*a* and extending upward, so as to pre-clamp and position the bottom and both sides of the ingredient pack 9, thereby preventing the ingredient pack 9 from falling downward or shifting laterally. The base support 123*a* is slidably arranged on the moving frame 12** through a guide shaft.

The two pack clamping frames 123 have a supporting state, where they approach each other to support the ingredient pack 9, and a releasing state, where they separate from each other to disengage from the ingredient pack 9. In the supporting state, a clearance aperture with a length smaller than that of the ingredient pack 9 is formed between the bottoms of the two pack clamping frames 123, which allows passage of a lower end portion of the ingredient pack 9 therethrough, so as to facilitate the pack-breaking mechanism 7 to cut open the ingredient pack 9, and to provide bottom support to prevent the ingredient pack 9 from directly falling.

The machine body 1 is provided with a seventh driving assembly 8 configured to drive the two pack clamping frames 123 to switch between the supporting state and the releasing state.

The seventh driving assembly 8 includes:

- two sets of elastic pack clamping frame resetting members 81, wherein each set of the pack clamping frame resetting member 81 is arranged between its corresponding pack clamping frame 123 and the machine body 1, and the two sets of the pack clamping frame resetting members 81 are configured to provide elastic return forces that bring the two pack clamping frames 123 closer to each other; each set of the pack clamping frame resetting member includes two springs, and the two springs are located between left and right ends of the corresponding pack clamping frame resetting member 123 and the moving frame 12; and
- two extruding portions 32, located on upper sides of the two pack clamping frames 123 respectively, wherein a lower side of each of the extruding portions 32 is provided with a ninth inclined surface 324, and an upper side of each of the pack clamping frames 123 is provided with a tenth inclined surface **123*c*; and a fourth driving assembly 34, configured to drive the two extruding portions 32 to move from top to bottom in the extruding state to extrude the ingredient from the ingredient pack 9**.

When the fourth driving assembly 34 drives the two extruding portions 32 to move from top to bottom to the lower end of the ingredient pack placement area 121, the ninth inclined surfaces 324 on the two extruding portions 32 cooperate with the corresponding tenth inclined surfaces 123*c* on the pack clamping frames 123 to drive the two pack clamping frames 123 to move away from each other and switch to the releasing state. At this time, the two extruding portions 32 are switched to the disengaging state, so as to facilitate the pack recycling mechanism 4 to discard the empty ingredient pack 9. After the fourth driving assembly 34 drives the two extruding portions 32 to move from bottom to top and disengage from the pack clamping frames 123, the pack clamping frames 123 approach each other under the action of the two sets of the pack clamping frame resetting members 81.

The working principle is described below.

After the user places the ingredient pack 9 into the ingredient pack placement area 121 through the ingredient pack inlet 11, the ingredient pack 9 is scanned, and then the pack clamping mechanism 2 activates, so that the two clamping portions 22 and the two extruding portions 32 clamp the ingredient pack 9. Afterwards, the pack-breaking mechanism 7 activates, driving the two cutting portions 712 to approach each other and cut an opening at the lower end of the ingredient pack 9; after the ingredient pack 9 is cut open, the pack-breaking mechanism 7 resets, and the fourth driving assembly 34 activates, driving the two extruding portions 32 to extrude the ingredients in the ingredient pack 9 into the cooking chamber 54 from top to bottom. After the two extruding portions 32 complete the extrusion process, they are switched to the disengaging state at the lower end of the ingredient pack placement area 121, and then the pack recycling mechanism 4 activates, driving the entire moving frame 12 to move above the pack collecting bin 41. Subsequently, the pack clamping mechanism 2 activates and releases the empty ingredient pack 9, so that the empty ingredient pack 9 fall into the pack collecting bin 41 under the force of gravity. Finally, the pack recycling mechanism 4 resets, both the pack clamping mechanism 2 and the pack extruding mechanism 3 return to their initial positions.

The present invention is not limited to the aforementioned optional embodiments. Under the premise of non-contradictory, each scheme can be arbitrarily combined. Any person skilled in the art may derive other variations of products under the inspirations of the present invention, but regardless of any modifications made to its shapes or structures, any technical solution that falls within the scope defined by the claims of the present invention shall fall within the scope of protection of the present invention.

What is claimed is:

1. A baking machine, comprising:

a machine body;

an ingredient pack placement area, arranged on the machine body, wherein the machine body is provided with an ingredient pack inlet for placing an ingredient pack into the ingredient pack placement area;

a pack-breaking mechanism, arranged on the machine body and configured to cut open the ingredient pack;

a pack extruding mechanism, arranged on the machine body and configured to extrude ingredients from the ingredient pack;

a cooking mechanism, arranged on the machine body and configured to receive and cook the ingredients extruded from the ingredient pack; and a pack clamping mechanism, arranged on the machine body and configured to clamp and position the ingredient pack, wherein the pack clamping mechanism includes two clamping portions, the machine body is provided with a first mounting portion, the two clamping portions are both arranged on the first mounting portion and respectively located on opposite sides of the first mounting portion;

the two clamping portions have a clamping state where they approach each other and clamp the ingredient pack, and a loosening state where they move away from each other and disengage from the ingredient pack; and the pack clamping mechanism further includes a second driving assembly configured to drive the two clamping portions to switch between the clamping state and the loosening state, wherein the second driving assembly includes:

a second motor;

a second lead screw, arranged on an output end of the second motor;

a second nut seat, threadedly connected to the second lead screw; wherein a lower side of the second nut seat is provided with a first inclined surface, and the second nut seat is further provided with a second triggering portion;

a third microswitch and a fourth microswitch, arranged on the machine body and respectively located on opposite sides of the second nut seat;

a linkage member, slidably arranged on the first mounting portion in a vertical direction, wherein a resetting assembly for linkage member is provided between the linkage member and the first mounting portion; an upper side of the linkage member is provided with a second inclined surface that abuts against the first inclined surface, and a lower side of the linkage member is provided with two third inclined surfaces; each of the clamping portions is provided with a fourth inclined surface, and the two third inclined surfaces abut against the two fourth inclined surfaces, respectively; and a first elastic assembly, arranged on the first mounting portion and configured to drive the two clamping portions to approach each other, when the second motor drives the second nut seat to move toward the third microswitch through the second lead screw, the second nut seat drives the linkage member to move downward through the cooperation of the first inclined surface and the second inclined surface, and the linkage member drives the two clamping portions to move away from each other and simultaneously stores energy in the resetting assembly and the first elastic assembly through the cooperation of the two third inclined surfaces and the two fourth inclined surfaces; when the second triggering portion activates the third microswitch, the second motor stops, and the two clamping portions are switched to the loosening state;

when the second motor drives the second nut seat to move toward the fourth microswitch through the second lead screw, under the reset action of the resetting assembly and the first elastic assembly, the linkage member moves upward to reset and the two clamping portions approach each other; when the second triggering portion activates the fourth microswitch, the second motor stops, and the two clamping portions are switched to the clamping state.

2. The baking machine according to claim 1, further comprising:

a pack recycling mechanism, arranged on the machine body, wherein the pack recycling mechanism includes a moving frame, a pack collecting bin and a first driving assembly;

wherein the pack clamping mechanism is arranged on the moving frame; or, both the pack clamping mechanism and the pack extruding mechanism are arranged on the moving frame;

the moving frame includes a second position located on an upper side of the cooking mechanism and a first position located on an upper side of the pack collecting bin;

the first driving assembly is configured to drive the moving frame to reciprocate between the second position and the first position.

3. The baking machine according to claim 2, wherein the first driving assembly includes a first motor and a first transmission assembly, an output end of the first motor is connected to an input end of the first transmission assembly, and an output end of the first transmission assembly is connected to the moving frame;

the moving frame is provided with a first triggering portion, the machine body is provided with a first microswitch and a second microswitch located on opposite sides of the first triggering portion;

when the first motor drives the moving frame to move toward the first microswitch through the first transmission assembly, and the first triggering portion activates the first microswitch, the first motor stops and the moving frame is located at the first position; when the first motor drives the moving frame to move toward the second microswitch through the first transmission assembly, and the first triggering portion activates the second microswitch, the first motor stops and the moving frame is located at the second position.

4. The baking machine according to claim 2, wherein the ingredient pack inlet is arranged adjacent to the first position, and an ingredient pack door is provided on the machine body for opening and closing the ingredient pack inlet.

5. The baking machine according to claim 4, wherein the ingredient pack door is rotatably connected to the machine body, and a door closing assembly is provided between the ingredient pack door and the machine body; the door closing assembly includes:

a first connecting rack, wherein one end of the first connecting rack is hinged to the ingredient pack door, a first tension spring is provided between the other end of the first connecting rack and the machine body, and an eighth triggering portion is provided on the first connecting rack;

a first curved guide portion, arranged on the machine body, wherein the eighth triggering portion is slidably connected to the first curved guide portion; and a twelfth microswitch, arranged on the machine body, wherein when the ingredient pack door is closed, the eighth triggering portion activates the twelfth microswitch.

6. The baking machine according to claim 1, wherein the pack extruding mechanism includes two extruding portions, the machine body is further provided with a second mounting portion, and the two extruding portions are both arranged on the second mounting portion and respectively located on opposite sides of the ingredient pack placement area;

the two extruding portions have an extruding state where they approach each other and clamp the ingredient pack, and a disengaging state where they move away from each other and disengage from the ingredient pack; the second mounting portion is provided with a second elastic assembly configured to drive the two extruding portions to approach each other;

the lower side of the linkage member is further provided with two fifth inclined surfaces, each of the extruding portions is provided with a sixth inclined surface, and the two fifth inclined surfaces abut against the two sixth inclined surfaces, respectively;

when the second motor drives the second nut seat to move toward the third microswitch through the second lead screw, the second nut seat drives the linkage member to move downward through the cooperation of the first inclined surface and the second inclined surface, the linkage member drives the two extruding portions to move away from each other through the cooperation of the two fifth inclined surfaces and the two sixth inclined surfaces and simultaneously stores energy in the resetting assembly and the second elastic assembly; when the second triggering portion activates the third microswitch, the second motor stops, and the two extruding portions are switched to the disengaging state;

when the second motor drives the second nut seat to move toward the fourth microswitch through the second lead screw, under the reset action of the resetting assembly and the second elastic assembly, the linkage member moves upward to reset and the two extruding portions approach each other; when the second triggering portion activates the fourth microswitch, the second motor stops, and the two extruding portions are switched to the extruding state.

7. The baking machine according to claim 6, wherein the first elastic assembly includes two sets of first springs, each set of the first springs is arranged between its corresponding clamping portion and the first mounting portion;

the second elastic assembly includes two sets of second springs, each set of the second springs is arranged between its corresponding extruding portion and the second mounting portion.

8. The baking machine according to claim 1, wherein the two clamping portions are slidably arranged on the first mounting portion;

or, the two clamping portions are rotatably arranged on the first mounting portion.

9. The baking machine according to claim 1, wherein the cooking mechanism includes a first baking pan and a second baking pan located on opposite sides, wherein the first baking pan has a closed state, where it cooperates with the second baking pan to form a cooking chamber, and an open state, where it is flipped and opened away from the second baking pan; an upper side of the cooking chamber is provided with an ingredient inlet configured to receive the ingredient extruded from the ingredient pack; and a switching mechanism is provided between the first baking pan and the machine body and configured to switch the first baking pan between the closed state and the open state.

10. The baking machine according to claim 9, wherein the switching mechanism includes a sixth motor, a sixth transmission assembly, and a sixth rotating shaft; an output end of the sixth motor is connected to an input end of the sixth transmission assembly, an output end of the sixth transmission assembly is connected to the sixth rotating shaft, and the sixth rotating shaft is connected to the first baking pan;

the sixth rotating shaft is provided with a sixth triggering portion, and the machine body is provided with a ninth microswitch and a tenth microswitch;

when the sixth motor drives the sixth rotating shaft to rotate counterclockwise through the sixth transmission assembly until the sixth triggering portion activates the ninth microswitch, the sixth motor stops and the first baking pan is switched to the open state; when the sixth motor drives the sixth rotating shaft to rotate clockwise through the sixth transmission assembly until the sixth triggering portion activates the tenth microswitch, the sixth motor stops and the first baking pan is switched to the closed state.

11. The baking machine according to claim 1, wherein pack clamping frames are respectively arranged on opposite sides at the bottom of the ingredient pack placement area, and the pack clamping frames are slidably arranged on the machine body;

the two pack clamping frames have a supporting state, where they approach each other and hold the ingredient pack, and a releasing state, where they move away from each other and disengage from the ingredient pack;

the machine body is provided with a seventh driving assembly configured to drive the two pack clamping frames to switch between the supporting state and the releasing state.

12. The baking machine according to claim 11, wherein the seventh driving assembly includes:

two sets of elastic pack clamping frame resetting members, wherein each set of the pack clamping frame resetting member is arranged between its corresponding pack clamping frame and the machine body, and the two sets of the pack clamping frame resetting members are configured to provide elastic return forces that bring the two pack clamping frames closer to each other; and two extruding portions, located on upper sides of the two pack clamping frames respectively, wherein a lower side of each of the extruding portions is provided with a ninth inclined surface, and an upper side of each of the pack clamping frames is provided with a tenth inclined surface; and a fourth driving assembly, configured to drive the two extruding portions to move from top to bottom in the extruding state to extrude the ingredient from the ingredient pack;

when the fourth driving assembly drives the two extruding portions to move from top to bottom to an output end of the ingredient pack placement area, the ninth inclined surfaces on the two extruding portions cooperate with the corresponding tenth inclined surfaces on the pack clamping frames to drive the two pack clamping frames to move away from each other and switch to the releasing state.

13. A baking machine, comprising:

a machine body;

an ingredient pack placement area, arranged on the machine body, wherein the machine body is provided with an ingredient pack inlet for placing an ingredient pack into the ingredient pack placement area;

a pack-breaking mechanism, arranged on the machine body and configured to cut open the ingredient pack;

a pack extruding mechanism, arranged on the machine body and configured to extrude ingredients from the ingredient pack; and a cooking mechanism, arranged on the machine body and configured to receive and cook the ingredients extruded from the ingredient pack, wherein the pack extruding mechanism includes two extruding portions, the machine body is further provided with a second mounting portion, and the two extruding portions are both arranged on the second mounting portion and respectively located on opposite sides of the second mounting portion;

the two extruding portions have an extruding state where they approach each other and clamp the ingredient pack, and a disengaging state where they move away from each other and disengage from the ingredient pack;

the pack extruding mechanism further includes a third driving assembly configured to drive the two extruding portions to switch between the extruding state and the disengaging state; and a fourth driving assembly configured to drive the two extruding portions to move from top to bottom in the extruding state to extrude the ingredients from the ingredient pack, wherein the third driving assembly includes:

a second motor;

a second lead screw, arranged on an output end of the second motor;

a second nut seat, threadedly connected to the second lead screw, wherein a lower side of the second nut seat is provided with a first inclined surface, and the second nut seat is further provided with a second triggering portion;

a third microswitch and a fourth microswitch, arranged on the machine body and respectively located on opposite sides of the second nut seat;

a linkage member, slidably arranged on the machine body in a vertical direction, wherein a resetting assembly for linkage member is provided between the linkage member and the machine body; an upper side of the linkage member is provided with a second inclined surface that abuts against the first inclined surface, and a lower side of the linkage member is further provided with two fifth inclined surfaces; each of the extruding portions is provided with a sixth inclined surface, and the two fifth inclined surfaces abut against the two sixth inclined surfaces respectively; and a second elastic assembly, arranged on the second mounting portion and configured to drive the two extruding portions to approach each other;

when the second motor drives the second nut seat to move toward the third microswitch through the second lead screw, the second nut seat drives the linkage member to move downward through the cooperation of the first inclined surface and the second inclined surface, and the linkage member drives the two extruding portions to move away from each other and simultaneously stores energy in the resetting assembly and the second elastic assembly through the cooperation of the two fifth inclined surfaces and the two sixth inclined surfaces; when the second triggering portion activates the third microswitch, the second motor stops, and the two extruding portions are switched to the disengaging state;

when the second motor drives the second nut seat to move toward the fourth microswitch through the second lead screw, under the reset action of the resetting assembly and the second elastic assembly, the linkage member moves upward to reset and the two extruding portions approach each other; when the second triggering portion activates the fourth microswitch, the second motor stops, and the two extruding portions are switched to the extruding state.

14. The baking machine according to claim 13, wherein the third driving assembly further includes two seventh inclined surfaces arranged on opposite sides of the machine body; and a lower side of each of the extruding portions is provided with an eighth inclined surface;

when the fourth driving assembly drives the two extruding portions to move from top to bottom to a lower end of the ingredient pack placement area, the two eighth inclined surfaces slide along the two seventh inclined surfaces respectively to force the two extruding portions to move away from each other to switch to the disengaging state and store energy in the second elastic assembly.

15. The baking machine according to claim 13, wherein the fourth driving assembly includes a fourth motor and a fourth transmission assembly, the fourth motor is connected to an input end of the fourth transmission assembly, and an output end of the fourth transmission assembly is connected to the second mounting portion;

the second mounting portion is provided with a fourth triggering portion, the machine body is provided with a fifth microswitch located on an upper side the fourth triggering portion, and a sixth microswitch located on a lower side the fourth triggering portion;

when the fourth motor drives the second mounting portion and the two extruding portions to move from top to bottom through the fourth transmission assembly until the fourth triggering portion activates the sixth microswitch, the fourth motor stops; when the fourth motor drives the second mounting portion and the two extruding portions to move from bottom to top through the fourth transmission assembly until the fourth triggering portion activates the fifth microswitch, the fourth motor stops.

16. A baking machine, comprising:

a machine body;

an ingredient pack placement area, arranged on the machine body, wherein the machine body is provided with an ingredient pack inlet for placing an ingredient pack into the ingredient pack placement area;

a pack-breaking mechanism, arranged on the machine body and configured to cut open the ingredient pack;

a pack extruding mechanism, arranged on the machine body and configured to extrude ingredients from the ingredient pack; and a cooking mechanism, arranged on the machine body and configured to receive and cook the ingredients extruded from the ingredient pack, wherein the pack-breaking mechanism includes two scissor heads arranged opposite to each other, and each of the scissor heads is provided with a cutting portion; the two cutting portions have a cutting state and a non-cutting state; and the pack-breaking mechanism further includes a fifth driving assembly configured to drive the cutting portions on the two scissor heads to switch between the cutting state and the non-cutting state, wherein the fifth driving assembly includes a fifth motor, a fifth lead screw, and a fifth nut seat; the fifth motor is drivingly connected to the fifth lead screw, and the fifth nut seat is threadedly connected to the fifth lead screw;

each of the scissor heads is provided with a scissor head guide portion at an end away from its cutting portion; the fifth nut seat is provided with two sliding portions, which are slidably connected to the two scissor head guide portions, respectively; the machine body is provided with a scissor head rotating shaft, and each of the scissor heads is rotatably connected to the scissor head rotating shaft at an end away from the cutting portion;

the fifth nut seat is provided with a fifth triggering portion, and the machine body is provided with a seventh microswitch and an eighth microswitch respectively located on opposite sides of the fifth triggering portion;

when the fifth motor drives the fifth nut seat to move toward the seventh microswitch through the fifth lead screw, the fifth nut seat drives the two sliding portions to slide along the two scissor head guide portions respectively, thereby bringing the two cutting portions together to switch to the cutting state; when the fifth triggering portion activates the seventh microswitch, the fifth motor stops; when the fifth motor drives the fifth nut seat to move toward the eighth microswitch through the fifth lead screw, the fifth nut seat drives the two sliding portions to slide along the two scissor head guide portions respectively, thereby separating the two cutting portions to switch to the non-cutting state; when the fifth triggering portion activates the eighth microswitch, the fifth motor stops.

17. The baking machine according to claim 16, wherein each of the scissor heads is provided with a pre-clamping pressure block for clamping the ingredient pack, the pre-clamping pressure block is slidably arranged on its corresponding scissor head, and a pressure block elastic resetting member is provided between the pre-clamping pressure block and its corresponding scissor head;

when the fifth driving assembly drives the two cutting portions from the non-cutting state to the cutting state, the two pre-clamping pressure blocks are configured to first clamp the ingredient pack and then the two cutting portions cut the ingredient pack; when the fifth driving assembly drives the two cutting portions from the cutting state back to the non-cutting state, the two cutting portions are configured to move away from each other before the two pre-clamping pressure blocks.

* * * * *